US006999393B2

(12) United States Patent
Yamada

(10) Patent No.: US 6,999,393 B2
(45) Date of Patent: Feb. 14, 2006

(54) OPTICAL DISC RECORDING APPARATUS WITH REALTIME UPDATING OF STRATEGY

(75) Inventor: Seiya Yamada, Shimada (JP)

(73) Assignee: Yamaha Corporation, Hamamatsu (JP)

( * ) Notice: Subject to any disclaimer, the term of this patent is extended or adjusted under 35 U.S.C. 154(b) by 453 days.

(21) Appl. No.: 10/068,503

(22) Filed: Feb. 5, 2002

(65) Prior Publication Data

US 2002/0159352 A1 Oct. 31, 2002

(30) Foreign Application Priority Data

Feb. 5, 2001 (JP) ............................. 2001-028773

(51) Int. Cl.
*G11B 7/45* (2006.01)

(52) U.S. Cl. ................................. 369/59.11; 369/59.12
(58) Field of Classification Search ............. 369/59.11, 369/59.12, 53.15
See application file for complete search history.

(56) References Cited

U.S. PATENT DOCUMENTS

| 5,642,343 | A  | * | 6/1997  | Toda et al.    | ............... | 369/47.53 |
| 6,493,305 | B1 | * | 12/2002 | Hayashi et al. | .......... | 369/59.12 |
| 6,535,470 | B1 | * | 3/2003  | Wu             | ............. | 369/53.3  |
| 6,563,775 | B1 | * | 5/2003  | Sato           | ......... | 369/47.53 |
| 6,704,269 | B1 | * | 3/2004  | Ogawa          | ....... | 369/116   |

FOREIGN PATENT DOCUMENTS

| JP | A6-012674   | 3/1993  |
| JP | 05-242480   | 9/1993  |
| JP | 07-169053   | 7/1995  |
| JP | 07-225948   | 8/1995  |
| JP | A10-106008  | 9/1996  |
| JP | 09-282697   | 10/1997 |
| JP | 11232651    | 8/1999  |
| JP | 11-283249   | 10/1999 |
| JP | 2000-285464 | 10/2000 |

* cited by examiner

*Primary Examiner*—Brian E. Miller
*Assistant Examiner*—Michael V. Battaglia
(74) *Attorney, Agent, or Firm*—Pillsbury Winthrop Shaw Pittman LLP

(57) ABSTRACT

A disc apparatus is designed for recording a signal on an optical disc by irradiating an optical beam according to a strategy which is stepwise updated by a given step amount. In the disc apparatus, a detector successively detects a linear velocity of the optical disc relative to the optical beam in realtime basis. A strategy generator operates every time the detector detects the linear velocity of the optical disc for successively generating the strategy according to the detected linear velocity. A storage has a plurality of storage areas, each being capable of memorizing the strategy successively generated by the strategy generator. A write controller rewrites one of the storage areas every time the strategy is generated until the strategy is updated by a given step amount and then rewrites another of the storage areas every time the strategy is generated while leaving said one storage area to hold the updated strategy, thereby updating the strategy through the plurality of the storage areas. A read selector selects the storage area holding the updated strategy to read therefrom the updated strategy while allowing the write controller to rewrite another storage area.

20 Claims, 17 Drawing Sheets

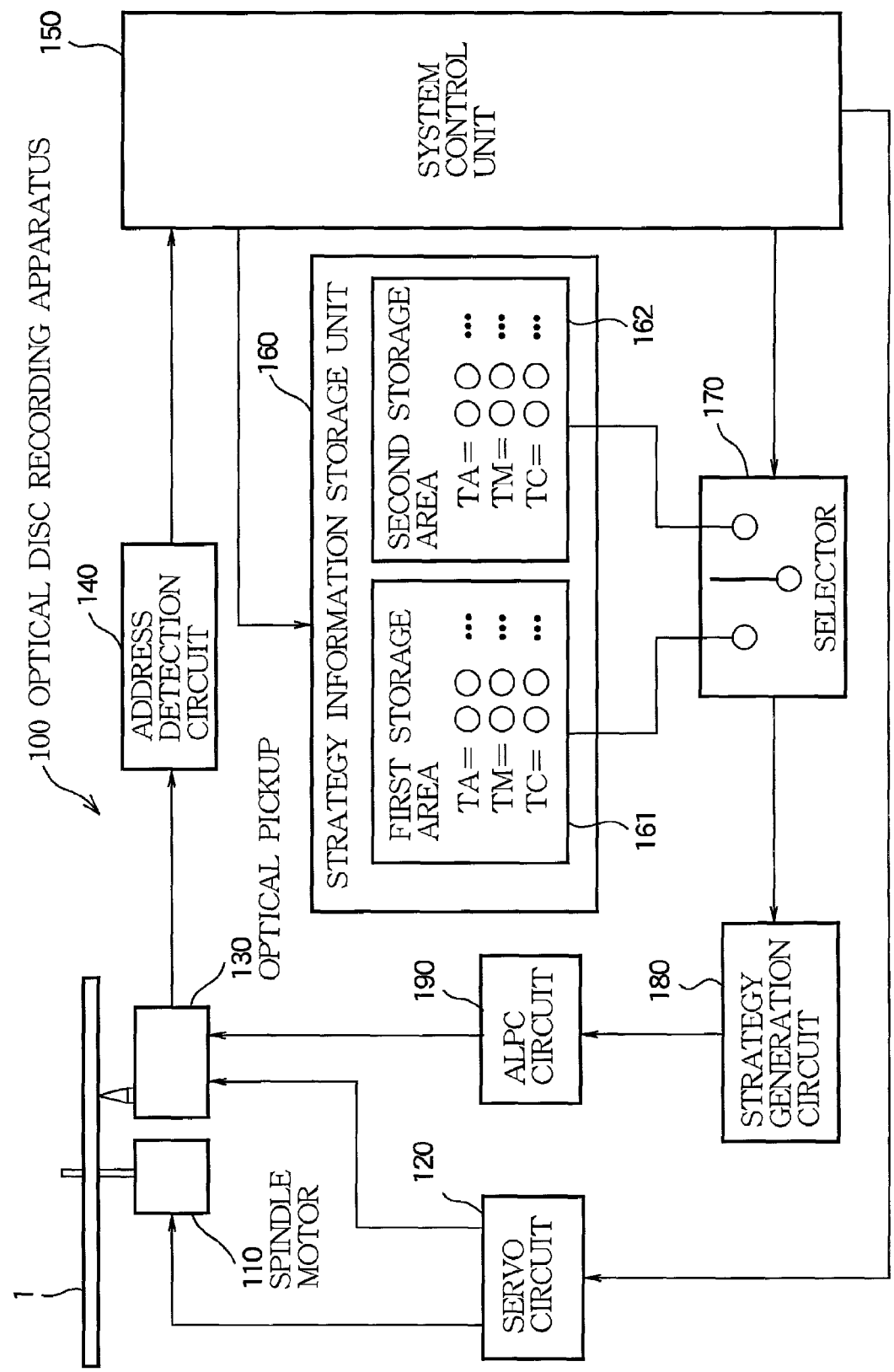

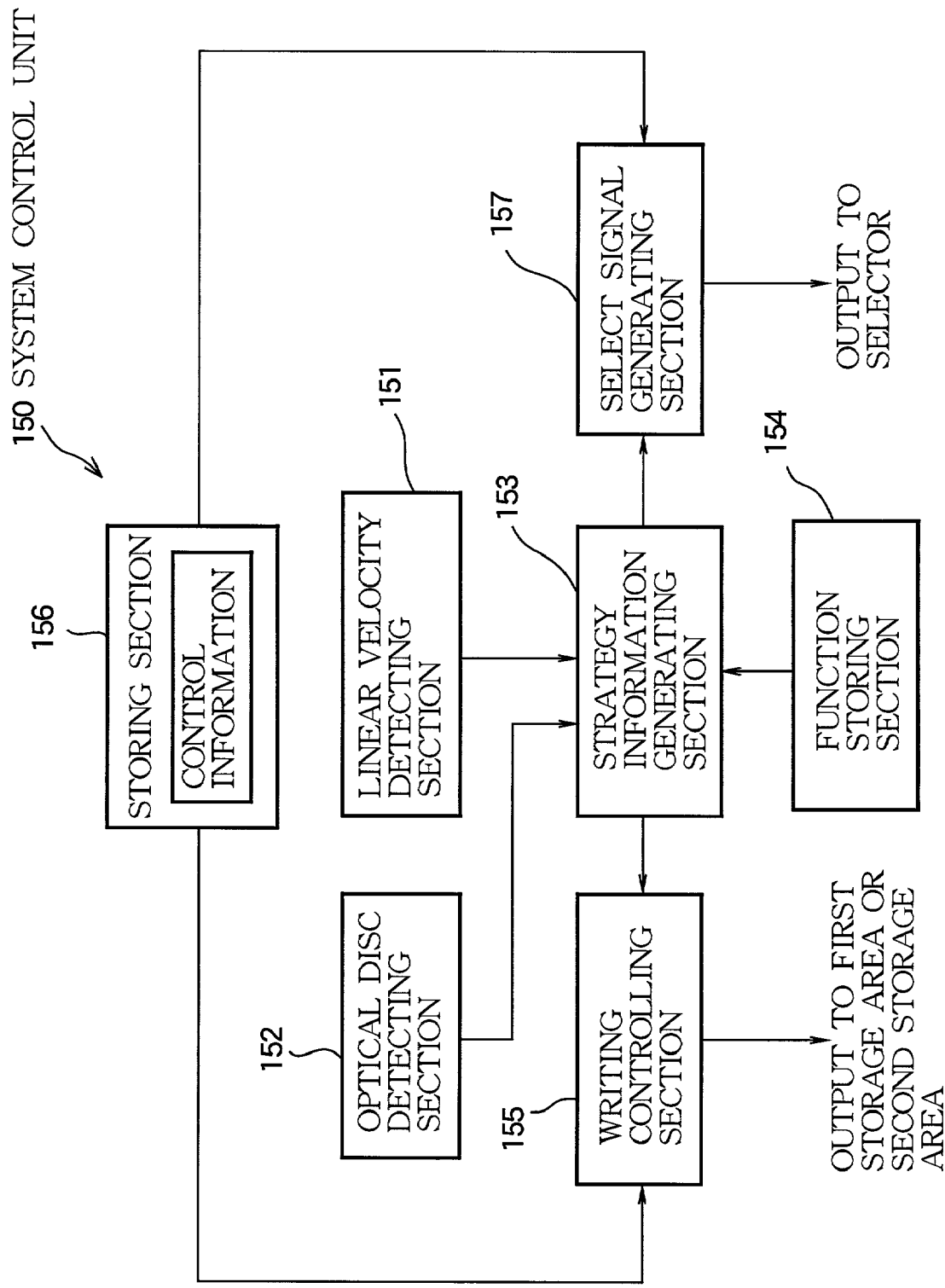

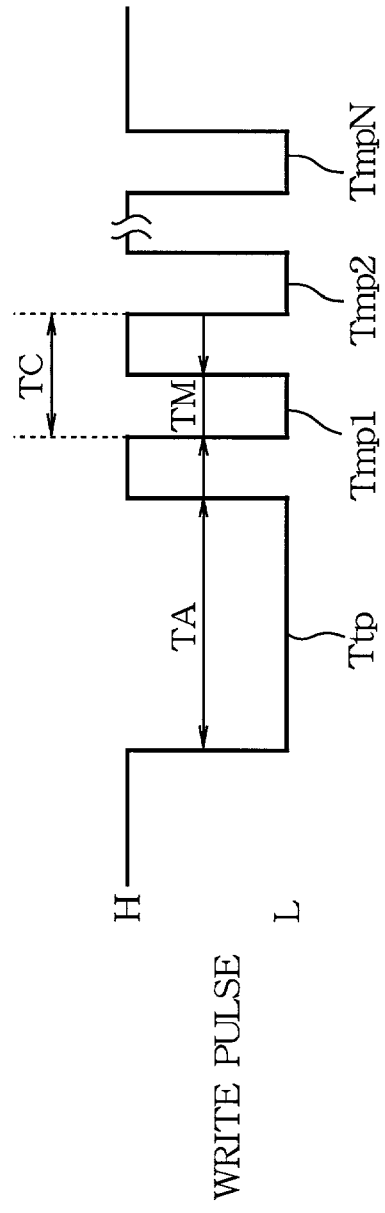
FIG.3 (a) WRITE PULSE
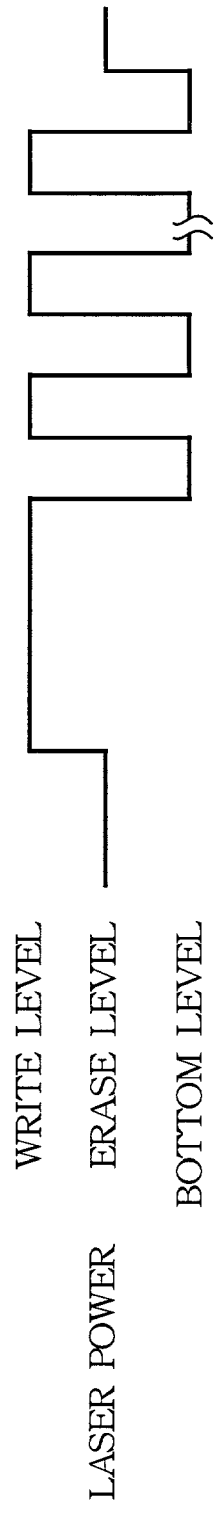
FIG.3 (b) LASER POWER — WRITE LEVEL, ERASE LEVEL, BOTTOM LEVEL
FIG.3 (c) PIT FORM

OPTICAL DISC A AND OPTICAL DISC B REPRESENT TYPE OF OPTICAL DISCS

FIG.5

| STRATEGY INFORMATION (PULSE WIDTH TA) | ARITHMETIC OPERATION | OUTPUT DESTINATION |
|---|---|---|
| TA1 (=20.0 μs) | TA1=TAs | FIRST STORAGE AREA |
| TA2 (=20.2 μs) | TA2−TAs<1.0 | SECOND STORAGE AREA |
| TA3 (=20.4 μs) | TA3−TAs<1.0 | SECOND STORAGE AREA |
| ⋯ | ⋯ | ⋯ |
| TA6 (=21.0 μs) | TA6−TAs=1.0 | SECOND STORAGE AREA |
| TA7 (=21.2 μs) | TA7−TAs>1.0, TA7=TAs | SECOND STORAGE AREA |
| TA8 (=21.4 μs) | TA8−TAs<1.0 | FIRST STORAGE AREA |
| ⋯ | ⋯ | ⋯ |

CONTROL INFORMATION (THRESHOLD VALUE ; 1.0 μs)

OPTICAL DISC A AND OPTICAL DISC B REPRESENT TYPE OF OPTICAL DISCS

FIG.10

| FIRST STRATEGY INFORMATION (PULSE WIDTH TA) | SECOND STRATEGY INFORMATION (PULSE WIDTH TA') | ARITHMETIC OPERATION | OUTPUT DESTINATION |
|---|---|---|---|
| TA1 (=20.0μs) | — | TA1=TAs | TA1→FIRST STORAGE AREA |
| TA2 (=20.2μs) | TA2' | TA2−TAs<1.0 | TA2→SECOND STORAGE AREA, TA2'→THIRD STORAGE AREA |
| TA3 (=20.4μs) | TA3' | TA3−TAs<1.0 | TA3→SECOND STORAGE AREA, TA3'→THIRD STORAGE AREA |
| ... | ... | ... | ... |
| TA6 (=21.0μs) | TA6' | TA6−TAs=1.0 | TA6→SECOND STORAGE AREA, TA6'→THIRD STORAGE AREA |
| TA7 (=21.2μs) | TA7' | TA7−TAs>1.0, TA7=TAs | TA7→SECOND STORAGE AREA, TA7'→THIRD STORAGE AREA |
| TA8 (=21.4μs) | TA8' | TA8−TAs<1.0 | TA8→FIRST STORAGE AREA, TA8'→THIRD STORAGE AREA |
| ... | ... | ... | ... |

CONTROL INFORMATION (THRESHOLD VALUE ; 1.0 μs)

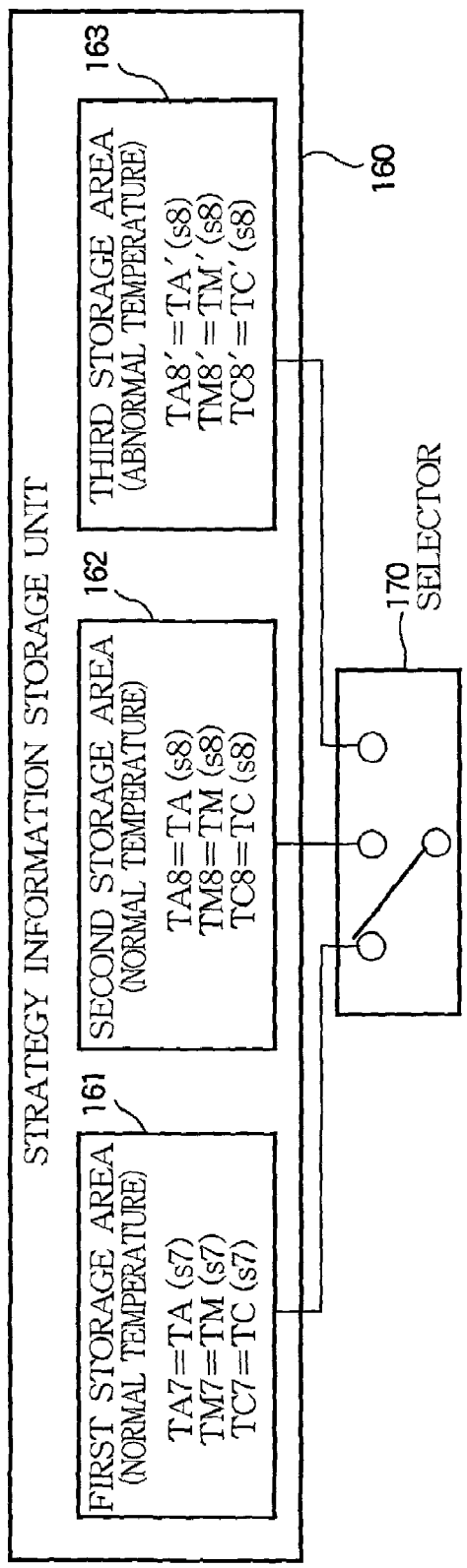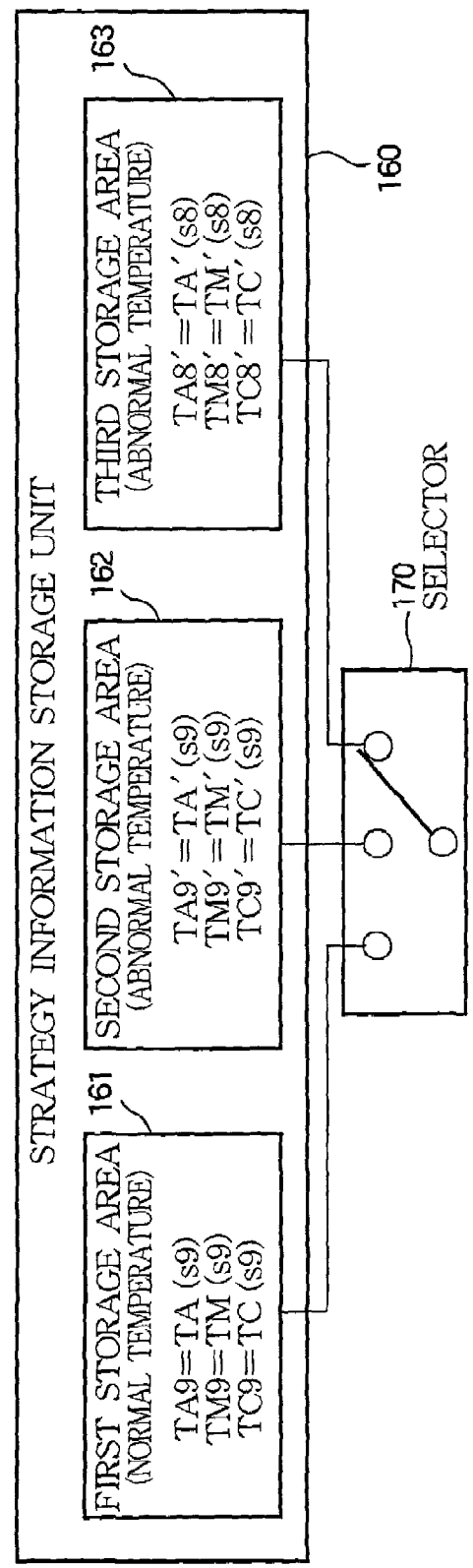

FIG.16(a) PULSE WIDTH FIXED TYPE
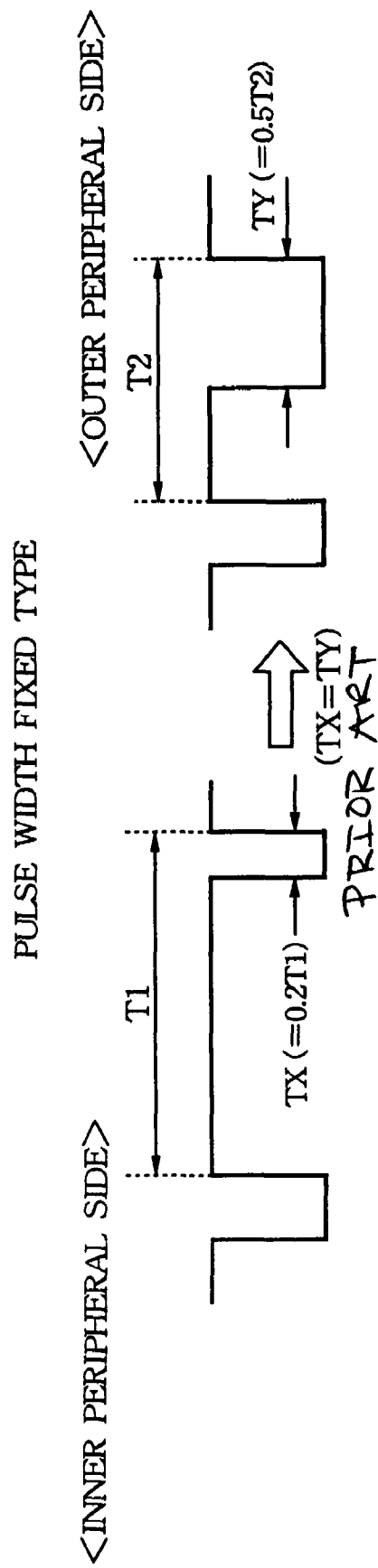
FIG.16(b) DUTY RATIO FIXED TYPE
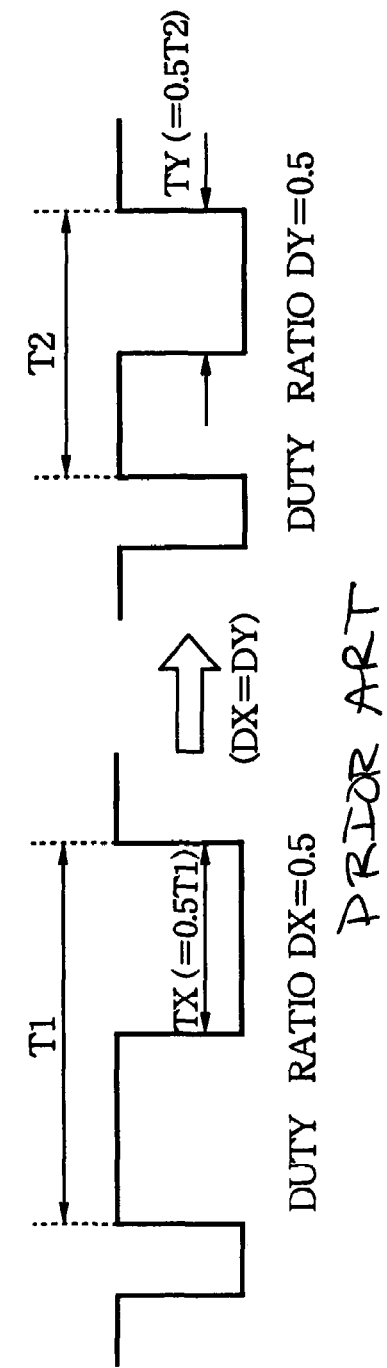

OPTICAL DISC RECORDING APPARATUS WITH REALTIME UPDATING OF STRATEGY

BACKGROUND OF THE INVENTION (i) Field of the Invention

The present invention relates to an optical disc recording apparatus.

(ii) Description of the Related Art

In the field of optical discs such as a CD-R (Compact Disc Recordable) and a CD-RW (Compact Disc ReWritable), a technique becomes widespread which utilizes a laser beam or the like to record information at a high speed with high density, for example, a CAV (Constant Angular Velocity) recording technique which sets a number of revolutions of an optical disc constant and changes a basic clock frequency of a recording signal in accordance with a position of an optical head.

In an optical disc apparatus adopting such a CAV recording system, a linear velocity (relative velocity of an optical disc to a laser spot) varies during recording of the signal. In order to perform accurate writing processing on the optical disc without varying the laser power used for writing information, a write pulse used for writing information on the optical disc must be optimized in accordance with a linear velocity. As a method for controlling such a write pulse, there are proposed a method which changes a duty ratio of the pulse in accordance with a linear velocity (which will be referred to as a pulse width fixed type hereinafter), and another method which changes a pulse width in accordance with a linear velocity (which will be referred to as a duty ratio fixed type hereinafter) and others.

FIG. 16(a) is a view for explaining a write pulse control method which is of the pulse width fixed type, and FIG. 16(b) is a view for explaining a write pulse control method which is of a duty ratio fixed type.

As shown in FIG. 16(a), in the write pulse control method which is of the pulse width fixed type, control is effected in such a manner that a pulse width TX at recording on the inner peripheral side of an optical disc where a linear velocity is small becomes equal to a pulse width TY at recording on the outer peripheral side of the optical disc where a linear velocity is large. Specifically, when a pulse cycle T1 on the inner peripheral side is set to 50 μsec; a pulse cycle T2 on the outer peripheral side, 20 μsec; and a pulse width TX on the inner peripheral side, 0.2*T1, the pulse width TY on the outer peripheral side is set to 0.5*T2 based on the following expressions (a) to (d). It is to be noted that each of the pulse cycles T1 and T2 represents a time required for forming one pit on the optical disc.

$$TX = 0.2 * T1 = 10 \text{ μsec} \qquad (a)$$

$$TY = TX = 10 \text{ μsec} \qquad (b)$$

$$T2:TY = 20:10 \qquad (c)$$

$$TY = 10/20 * T2 = 0.5 * T2 \qquad (d)$$

On the other hand, in the write pulse control method which is of the duty ratio fixed type, as shown in FIG. 16(b), control is effected in such a manner that a duty ratio DX on the inner peripheral side becomes equal to a duty ratio DY on the outer peripheral side. Specifically, when the pulse width TX on the inner peripheral side is set to 0.5*T1 (assuming that a pulse cycle on the inner peripheral side is T1 and a pulse cycle on the outer peripheral side is T2), the pulse width TY on the outer peripheral side is set to 0.5*T2 based on the following expressions (e) to (g).

$$DX = 0.5 * T1/T1 = 0.5 \qquad (e)$$

$$DY = DX = 0.5 \qquad (f)$$

$$TY = 0.5 * T2 \qquad (g)$$

The above-described write pulse control methods of the pulse width fixed type and the duty ratio fixed type are not necessarily always optimum. That is, determination of an optimum value of a compensation amount of the write pulse (which will be referred to as a strategy hereinafter) differs depending on a linear velocity as well as a structure or a type of the optical disc which is an information recording target. For example, in case of recording information on a specific optical disc, it may be possible to set an optimum strategy. However, in case of recording information on an optical disc which is a different type from the former optical disc, an optimum strategy may not be set, and there is a problem of, e.g., occurrence of a recording error or the like.

SUMMARY OF THE INVENTION

In view of the above-described problem, it is an object of the present invention to provide an optical disc recording apparatus capable of reducing recording errors.

To achieve this object, there is provided an apparatus for recording a signal on an optical disc by irradiating an optical beam according to a strategy which is stepwise updated by a given step amount. The apparatus comprises a detector that successively detects a linear velocity of the optical disc relative to the optical beam in realtime basis, a strategy generator that operates every time the detector detects the linear velocity of the optical disc for successively generating the strategy according to the detected linear velocity, a storage having a plurality of storage areas, each being capable of memorizing the strategy successively generated by the strategy generator, a write controller that rewrites one of the storage areas every time the strategy is generated until the strategy is updated by a given step amount and then rewrites another of the storage areas every time the strategy is generated while leaving said one storage area to hold the updated strategy, thereby updating the strategy through the plurality of the storage areas, a read selector that selects the storage area holding the updated strategy to read therefrom the updated strategy while allowing the write controller to rewrite another storage area, a pulse generator that generates a pulse waveform shaped according to the updated strategy fed from the read selector, and a recorder for irradiating the optical beam in response to the generated pulse waveform to record the signal on the optical disc.

According to this structure, the selector selects a storage area corresponding to a result of detection outputted from the linear velocity detector, and the latest strategy generated by the strategy generator is written in a storage area which is not selected by the selector among a plurality of the storage areas. Then, when the selector changes over selection of the storage area in accordance with a change in the linear velocity, the latest strategy corresponding to the linear velocity at the present moment is instantaneously supplied to the write pulse generator through the selector. As a result, writing errors during recording can be reduced.

BRIEF DESCRIPTION OF THE DRAWINGS

FIG. 1 is a block diagram showing a basic structure of an optical disc recording apparatus according to an embodiment;

FIG. 2 is a block diagram showing a functional structure of a system control unit according to the embodiment; FIGS. 3(a)–3(c) are views illustrating forms of write pulses;

FIG. 5 is a view illustrating a case where a destination to which strategy information is outputted is determined;

FIG. 10 is a view illustrating an operation of an output controlling section;

FIGS. 16(a) and 16(b) are views illustrating write pulse control methods of the prior art.

DETAILED DESCRIPTION OF THE PREFERRED EMBODIMENT

Figure 4:
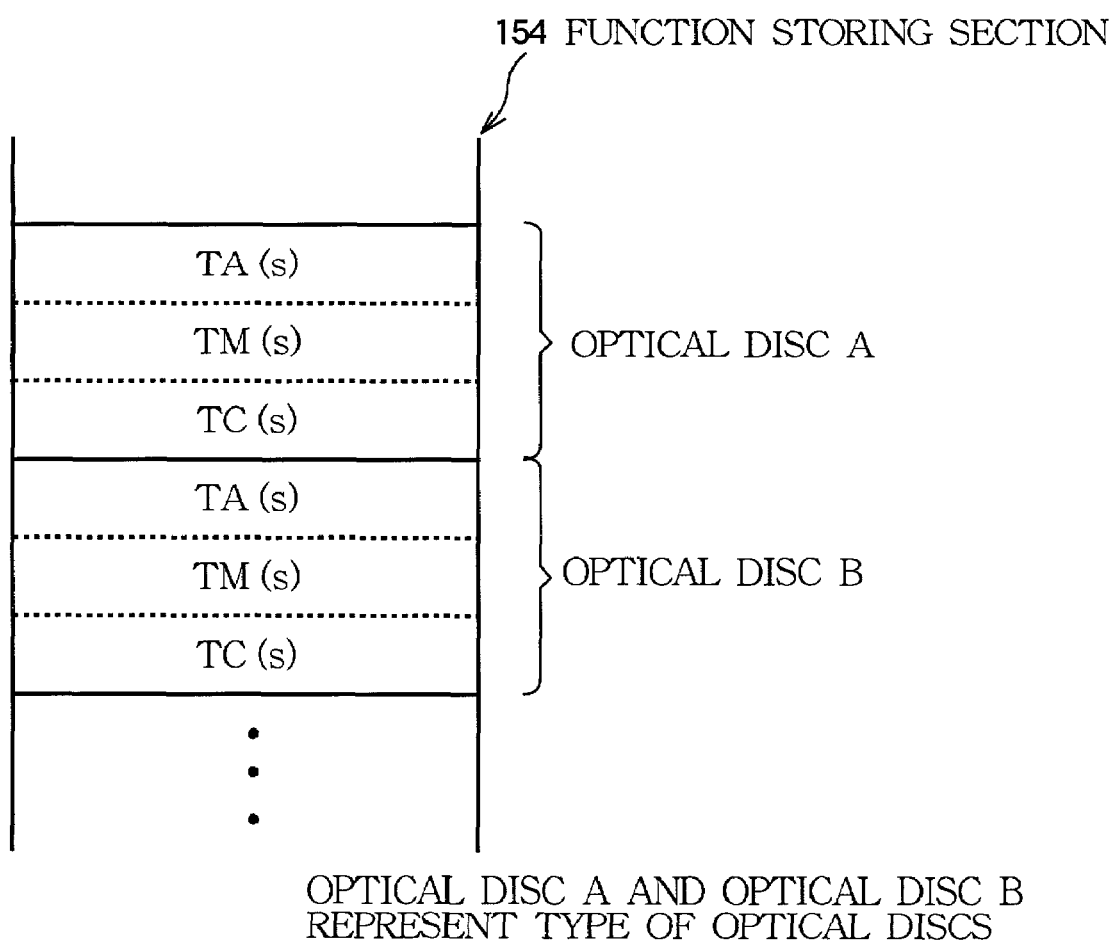
FIG. 4 is a view illustrating functions concerning the write pulse.

A preferred embodiment will now be described hereinafter in order to facilitate understanding of the present invention. This embodiment shows one mode of the present invention, and is not intended to restrict the scope of present invention. The embodiment can be expediently modified within the scope of the present invention.

A. Embodiment

FIG. 1 is a block diagram showing a primary structure of an optical disc recording apparatus 100.

The optical disc recording apparatus 100 is capable of recording information on a CD-R or a CD-RW. The apparatus includes: an optical disc 1; a spindle motor 110; a servo circuit 120; an optical pickup 130; an address detection circuit 140; a system control unit 150; a strategy information storage unit 160; a selector 170; a strategy generation circuit 180; and an ALPC (Automatic Laser Power Control) circuit 190.

The spindle motor 110 is provided for driving the optical disc 1 and rotates the optical disc 1 at a constant angular velocity (CAV) based on a control signal supplied from the servo circuit 120.

The servo circuit 120 controls rotation of the spindle motor 110 under control by the system control unit 150, and also controls a focus servo (servo used for focusing the laser spot), a tracking servo (servo used for tracing a track forming a pit) and others of the optical pickup 130.

The optical pickup 130 includes a laser diode, a four-split photodetector; an object lens actuator and others, and performs recording of information by irradiating the optical disc 1 with a laser beam. Upon receiving the light reflected from the optical disc 1, the optical pickup 130 generates a received light signal based on a result of light acceptance, and outputs the light signal to the address detection circuit 140.

The address detection circuit 140 extracts a wobble signal component from the received light acceptance signal supplied from the optical pickup 130, decodes address information, disc ID information and others contained in the wobble signal component, and outputs a result of decoding to the system control unit 150.

The system control unit 150 is provided for controlling each portion of the optical disc apparatus 100. FIG. 2 is a block diagram showing a functional structure of the system control unit 150.

The system control unit 150 includes: a linear velocity detecting section 151; an optical disc detecting section 152; a strategy information generating section 153; a function storing section 154; a writing controlling section 155; a storing section 156; and a select signal generating section 157.

The linear velocity detecting section 151 calculates a linear velocity s at a laser irradiation spot in accordance with a predetermined cycle based on the address information detected by the address detection circuit 140, and supplies the calculated linear velocity s to the strategy information generating section 153 and the select signal generating section 157.

The optical disc detecting section 152 determines a type of a disc based on the disc ID information detected in the address detection circuit 140, and supplies a result of the type detection to the strategy information generating section 153.

The strategy information generating section 153 is provided for generating strategy information constituted by a plurality of parameters used for forming a write pulse, and generates the strategy information in accordance with each linear velocity by making reference to the linear velocity s outputted from the linear velocity detecting section 151 and the result of the type detection outputted from the optical disc detecting section 152.

FIGS. 3(a)–3(c) are views illustrating the write pulse. A write pulse shown in FIG. 3(a) is a pulse signal used for controlling the laser power for forming on the optical disc 1 a pit whose length corresponds to recording information, and constituted by a top pulse Ttp and subsequent multi pulses Tmp1 to TmpN (value of N varies in accordance with a size of a pit to be recorded). The laser beam with which the optical disc 1 is irradiated is controlled by this write pulse. Specifically, as shown in FIGS. 3(a) and (b), in a period where the signal level of the write pulse is on the low level (L), the output level of the laser is controlled to the write level. When the signal level of the write pulse is changed from the low level (L) to the high level (H), the output level of the laser is switched from the write level to the bottom level in accordance with this change.

As described above, by controlling the output level of the laser based on the signal level of the write pulse, a pit whose length corresponds to recording information is formed on the optical disc 1 (see FIG. 3(c)). The strategy information generating section 153 can obtain respective parameters, i.e., a pulse width TA of the top pulse Ttp, a pulse width TM of the subsequent pulses Tmp1 to TmpN, and a pulse cycle TC of the multi pulses Tmp1 to TmpN in this write pulse in accordance with each linear velocity. It should be noted that the present invention is not restricted to these parameters.

FIG. 4 is a view illustrating functions concerning the write pulse stored in the function storing section 154.

As shown in this drawing, the functions concerning the write pulse are constituted by a function TA (s) of the pulse width TA having the linear velocity s as a parameter, a function TM (s) of the pulse width TM having the linear velocity s as a parameter, and a function TC (s) of the pulse cycle TC having the linear velocity s as a parameter. These functions concerning the write pulse are derived by first conducting a experiment or the like in advance, then measuring an optimum value of each parameter with respect to the linear velocity and formulating a result of measurement into the function. The function storing section 154 stores the thus obtained functions in corresponding with each type of the optical disc.

The strategy information generating section 153 specifies a set of functions corresponding to the type optical disc 1 based on a result of the type judgment supplied from the optical disc detecting section 152 when generating strategy information. Then, the strategy information generating section 153 substitutes the linear velocity s supplied from the linear velocity detecting section 151 for the respective corresponding functions TA (s), TM (s) and TC (c), and obtains a pulse width TA, a pulse width TM and a pulse cycle TC. Then, the strategy generator sequentially supplies the strategy information including the pulse width TA, the pulse width TM and the pulse cycle TC obtained as described above to the writing controlling section 155.

Upon receiving the strategy information from the strategy information generating section 153, the writing controlling section 155 reads control information stored in the storing section 156, and controls the writing of the strategy information to the strategy information storage unit 140 by comparing the read control information with the received strategy information. The control information stored in the storing section 156 is set in accordance with a resolution amount or a step amount capable of controlling an ON (write level) time, an OFF (bottom level) time and others of the laser pulse emitted from the optical pickup 130. In this embodiment, this control information is set to 1.0 μsec as the step amount.

The strategy information storage unit 160 is constituted by a rewritable storing device (for example, a RAM or the like), and a plurality of storage areas including a first storage area 161 and a second storage area 162 are prepared in the strategy information storage unit 160 (see FIG. 1). The first storage area 161 and the second storage area 162 can store the strategy information corresponding to a single linear velocity s with which the writing is carried out by the writing controlling section 155 (namely, strategy information including the respective parameters, i.e., the pulse width TA, the pulse width TM and the pulse cycle TC).

FIG. 5 is a view illustrating how the writing controlling section 155 operates to write the strategy information received from the strategy information generating section 153 into the first storage area 161 and the second storage area 162. Incidentally, the following description exemplifies only the pulse width TA among the respective parameters constituting the strategy information.

Upon receiving the pulse width TA1 (=20.0 μsec) corresponding to an initial linear velocity s1, the writing controlling section 155 writes the pulse width TA1 into a first RAM 161, and sets the pulse width TA1 as a reference pulse width TAs. When the writing controlling section 155 receives a pulse width TA2 (=20.2 μsec) corresponding to the next linear velocity s2, the write controller obtains a difference between the reference pulse width TAs and the pulse width TA2, and compares the obtained difference with the control information concerning the pulse width TA (threshold step value; 1.0 μsec).

Here, assuming that the obtained difference is smaller than the threshold value, a target area into which information is written is changed from the first storage area 161 to the second storage area 162, and the received pulse width TA2 is written into the second storage area 162. The writing controlling section 155 sequentially obtains a difference between the reference pulse width TAs and each pulse width successively supplied from the strategy information generating section 153. While the obtained difference is smaller than the threshold step value, the writing controlling section 155 sequentially rewrites the pulse width stored in the second storage area 162 without changing the area into which information is written.

When the writing controlling section 155 determines that the obtained difference is greater than the threshold value (pulse width TA7 shown in FIG. 5), the write controller writes the received pulse width TA7 into the second storage area 161, sets the pulse width TA7 as the updated reference pulse width TAs, and again changes a writing area to the first storage area 161. In this manner, the writing controlling section 155 switches the writing area for the strategy information between the first storage area 161 and the second storage area 162, and sequentially rewrites the strategy information stored in each storage area.

As similar to the writing controlling section 155, the select signal generating section 157 compares the strategy information sequentially supplied from the strategy information generating section 153 with the above-described control information, generates a select signal S1 based on a result of comparison, and supplies the generated select signal S1 to the selector 170.

In the explanation taking FIG. 5 as an example, when the select signal generating section 157 detects that generation of the strategy information is started by the strategy information generating section 153, the select signal generating section 157 generates the select signal S1 with which the first storage area 161 is to be selected, and outputs this signal to the selector 170. Then, the select signal generating section 157 sequentially obtains a difference between the reference strategy and the current strategy as similar to the output controlling section 155. When the select signal generating section 157 detects that the obtained difference has reached the threshold value (pulse width TA7 shown in FIG. 5), the section 157 generates the select signal S1 with which the second storage area 162 is to be selected in order to change over the strategy information to be used, and outputs this signal to the selector 170. In other words, the writing controlling section 155 writes the strategy information supplied from the strategy information generating section 155 into a storage area which is not selected by the select signal generating section 157.

Figure 6:
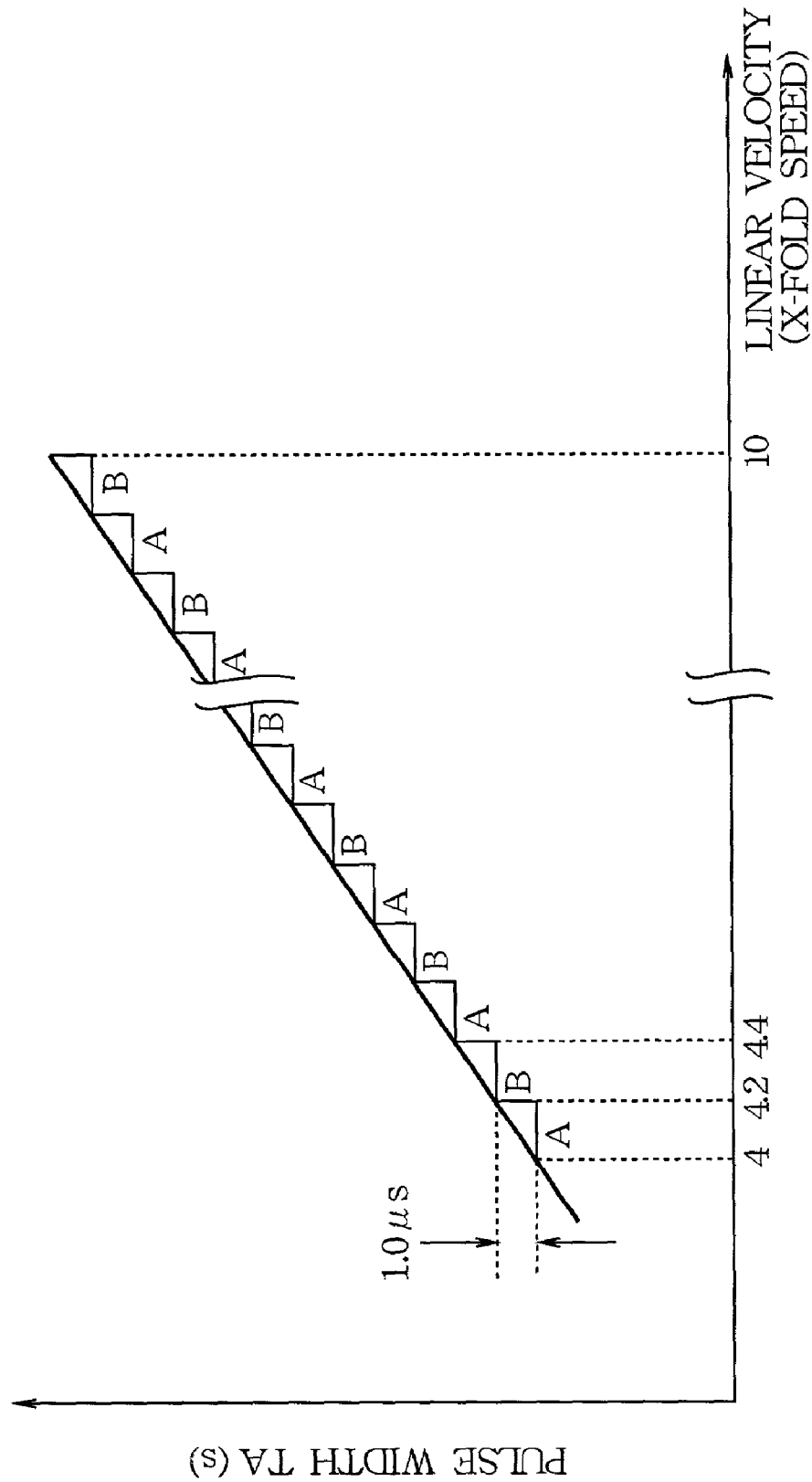
FIG. 6 is a view showing the relationship between strategy information and a linear velocity.

FIG. 6 is a view showing the relationship between the strategy information supplied from the selector 170 to the strategy generation circuit 180 and the linear velocity. Incidentally, as the linear velocity shown in FIG. 6, it is assumed that a four-fold speed is set on the innermost periphery and a tenfold speed (in conformity to Orange Book Part 3, Vol. 2, V1.0) is set on the outermost periphery, and FIG. 6 shows an example of only the pulse width TA constituting the strategy information.

As shown in FIG. 6, the strategy information (pulse width TA) supplied to the strategy generation circuit 180 is alternately changed over by the selector 170 in accordance with a gradual change in the linear velocity s. Specifically, while the first storage area 161 is selected by the selector 170 to read the updated strategy (linear velocity; "4"to "4.2"), the second storage area 162 functions as an alternative storage area, and the strategy information stored in the second storage area 162 is sequentially rewritten in accordance with a gradual change in the linear velocity (see FIG. 5). Then, when an amount of changes in the strategy information exceeds the above-described threshold step value (=1.0 μsec) (at linear velocity; "4.2"), the selector 170 changes over the storage area, and the new strategy information stored in the second storage area 162 is supplied to the strategy generation circuit 180.

When the selector 170 changes over the storage area, the first storage area 161 which has been held standing functions as an alternative storage area, and the strategy information stored in the first storage area 161 is sequentially rewritten in accordance with a gradual change in the linear velocity as similar to the above case. Then, when an amount of changes in the strategy information again exceeds the set threshold value (at linear velocity; "4.4"), the selector 170 again changes over the storage area, and the new updated strategy information stored in the first storage area 161 is supplied to the strategy generation circuit 180. As a result of repeatedly executing such processing, the optimum strategy information corresponding to the resolution capable of controlling ON/OFF time of the laser emitted from the optical pickup 130 is instantaneously supplied to the strategy generation circuit 180 through the selector 170.

The strategy generation circuit 180 applies compensation processing on recording data (effective to control the laser power at the time of recording), which has been subjected EFM (Eight to Fourteen Modulation) modulation and supplied from an encoder (not shown), based on the strategy information supplied from the selector 170, and outputs the obtained data to an ALPC circuit 190.

The ALPC circuit 190 controls the laser power emitted from the optical pickup 130 onto the optical disc 1 based on the recording data which is supplied from the strategy generation circuit 180 and has been subjected to the compensation processing.

(2) Operation of Embodiment

When start of CAV recording is instructed by a user, the optical disc detecting section 152 judges a type of the disc based on the disc ID information detected in the address detection circuit 140, and outputs a result of judgment to the strategy information generating section 153. On the other hand, the linear velocity detecting section 151 obtains the linear velocity s at the laser irradiation spot based on the address information detected in the address detection circuit 140, and outputs the obtained linear velocity s to the strategy information generating section 153.

After reading from the function storing section 154 the set of functions corresponding to the result of the judgment (the type of the optical disc) supplied from the optical disc detecting section 152, the strategy information generating section 153 inputs the linear velocity s sequentially outputted from the linear velocity detecting section 151 in the functions, and generates the strategy information. The writing controlling section 155 switches a writing area for the strategy information sequentially supplied from the strategy information generating section 153 between the first storage area 161 and the second storage area 162 based on the control information set in accordance with the resolution capable of separately controlling the ON/OFF time of the laser emitted from the optical pickup 130.

The select signal generating section 157 compares the strategy information sequentially supplied from the strategy information generating section 153 with the above-described control information, generates the select signal S1 based on a result of the comparison, and sequentially supplies the generated select signal S1 to the selector 170. Consequently, when the first storage area 161 is selected by the selector 170, the strategy information stored in the first storage area 161 is supplied to the strategy generation circuit 180, while the strategy information stored in the second storage area 162 is updated at any time. On the other hand, when the second storage area 162 is selected by the selector 170, the current strategy information stored in the second storage area 162 is supplied to the strategy generation circuit 180, while the strategy information stored in the first storage area 161 is updated for next time.

The strategy generation circuit 180 applies the compensation or correction processing on the recording data supplied from a non-illustrated encoder based on the strategy information supplied through the selector 170, and thereafter outputs the obtained data to the ALPC circuit 190. The ALPC circuit 190 controls the laser power with which the optical disc 1 is irradiated based on the recording data supplied from the strategy generation circuit 180, and the accurate information recording matching to the linear velocity s is thereby carried out.

As described above, in the optical disc recording apparatus 100 according to this embodiment, there are provided the first storage area 161 and the second storage area 162 as the storing section for storing the strategy information.

Here, when the first storage area 161 is selected by the selector 170, the second storage area 162 functions as a spare storage area, and the strategy information stored in the second storage area 162 is sequentially rewritten in accordance with a gradual change in the linear velocity. On the other hand, when the second storage area 162 is selected by the selector 170, the first storage area 161 functions as a spare storage area, and the strategy information stored in the first storage area 161 is sequentially rewritten. As a result, the optical disc apparatus 100 can instantaneously select the updated strategy information including a plurality of kinds of parameters such as the pulse width TA, the pulse width TM and the pulse cycle TC in response to a fine change in the linear velocity. Here, the respective parameters such as the pulse width TA, the pulse width TM and the pulse cycle TC included in the selected strategy information are optimum values obtained by individually conducting experiments or the like. Therefore, the optical disc apparatus 100 can instantaneously select the optimum strategy information in accordance with a small change in the linear velocity. As a result, writing errors with respect to the optical disc 1 can be reduced.

Further, the optical disc apparatus 100 according to this embodiment generates the strategy information by substituting the linear velocity s detected in the linear velocity detecting section 151 to the functions stored in the function storing section 154. Therefore, the memory capacity used for storing the strategy information can be reduced as compared with the conventional optical disc apparatus which stores the strategy information corresponding to each linear velocity in advance. Incidentally, the optical disc apparatus 100 according to this embodiment has the structure which independently performs writing control over the strategy information with respect to each storage area and output control over the strategy information by the selector 170. Alternatively, the apparatus may control writing of the strategy information in accordance with output control over the strategy information by the selector 170. For example, the apparatus may select a storage area which is not selected by the selector 170 as a storage area into which the strategy information is written.

The inventive disc apparatus 100 shown in FIG. 1 is operated by a computer program, which is stored in a machine readable storage medium such as ROM and loaded into the system control unit 150 having a CPU. The computer program is executable by the CPU for enabling the disc apparatus 100 to perform the process comprising the steps of successively detecting a linear velocity of the optical disc relative to the optical beam on a realtime basis, successively generating the strategy according to the detected linear velocity every time the linear velocity of the optical disc is detected, providing a plurality of storage areas, each being capable of memorizing the strategy successively generated, rewriting one of the storage areas every time the strategy is generated until the strategy is updated by a given step amount and then rewriting another of the storage areas every time the strategy is generated while leaving said one storage area to hold the updated strategy, thereby updating the strategy through the plurality of the storage areas, selecting the storage area holding the updated strategy to read therefrom the updated strategy while allowing the rewriting of another storage area, generating a pulse waveform shaped according to the updated strategy held in the selected storage area, and irradiating the optical beam in response to the generated pulse waveform to record the signal on the optical disc.

(3) Modification

Although the above has described the embodiment according to the present invention, the above-described embodiment is just an example, and various modifications can be carried out with respect to the embodiment without departing from the scope of the present invention.

<Modification 1>

Figure 7:
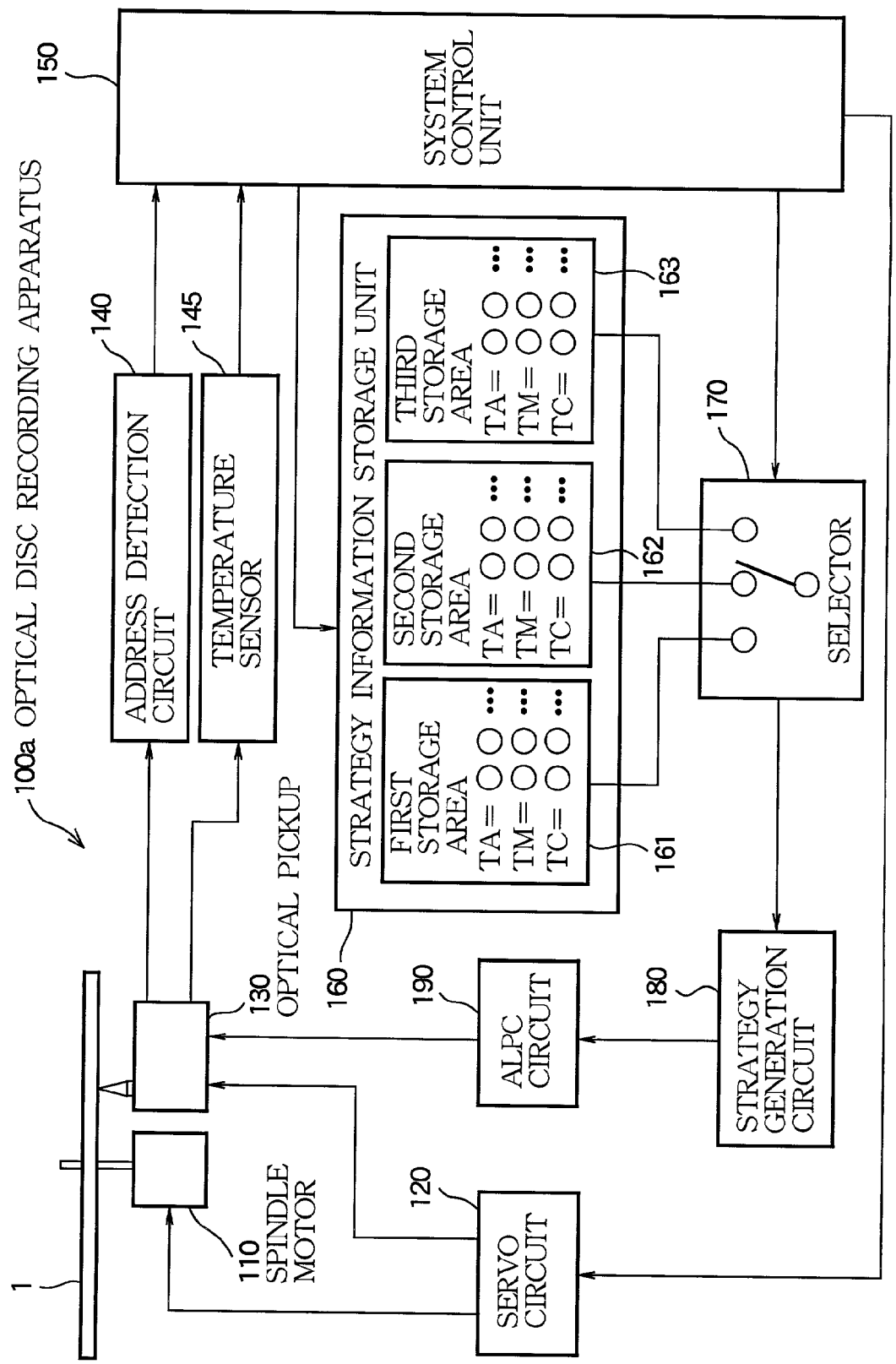
FIG. 7 is a block diagram showing a primary structure of an optical disc recording apparatus according to a first modification.

FIG. 7 is a block diagram showing a structure of an optical disc recording apparatus 100a according to a modification 1.

A temperature sensor 145 is provided to the optical disc apparatus 100a according to this modification, and a third storage area 163 is provided to the strategy information storage unit 160. Other structures are similar to those in FIG. 1, and like reference numerals denote like parts, thereby omitting their explanation.

As similar to the first storage area 161 and the second storage area 162 mentioned above, the third storage area 163 is a storage area which stores the strategy information corresponding to a single linear velocity generated by the strategy generating section 153. It is to be noted that the strategy information stored in each of the first to third storage areas 161 to 163 will be described later in detail, and explanation of the modification is continued.

The temperature sensor 145 is a sensor which detects an ambient temperature of a non-illustrated light emitting device (laser diode) included in the optical pickup 130, and constituted by, for example, a thermocouple sensor or an infrared sensor. When the temperature sensor 145 detects an ambient temperature of the light emitting device, it sequentially outputs a result of detection as temperature data to the system control unit 150.

Figure 8:
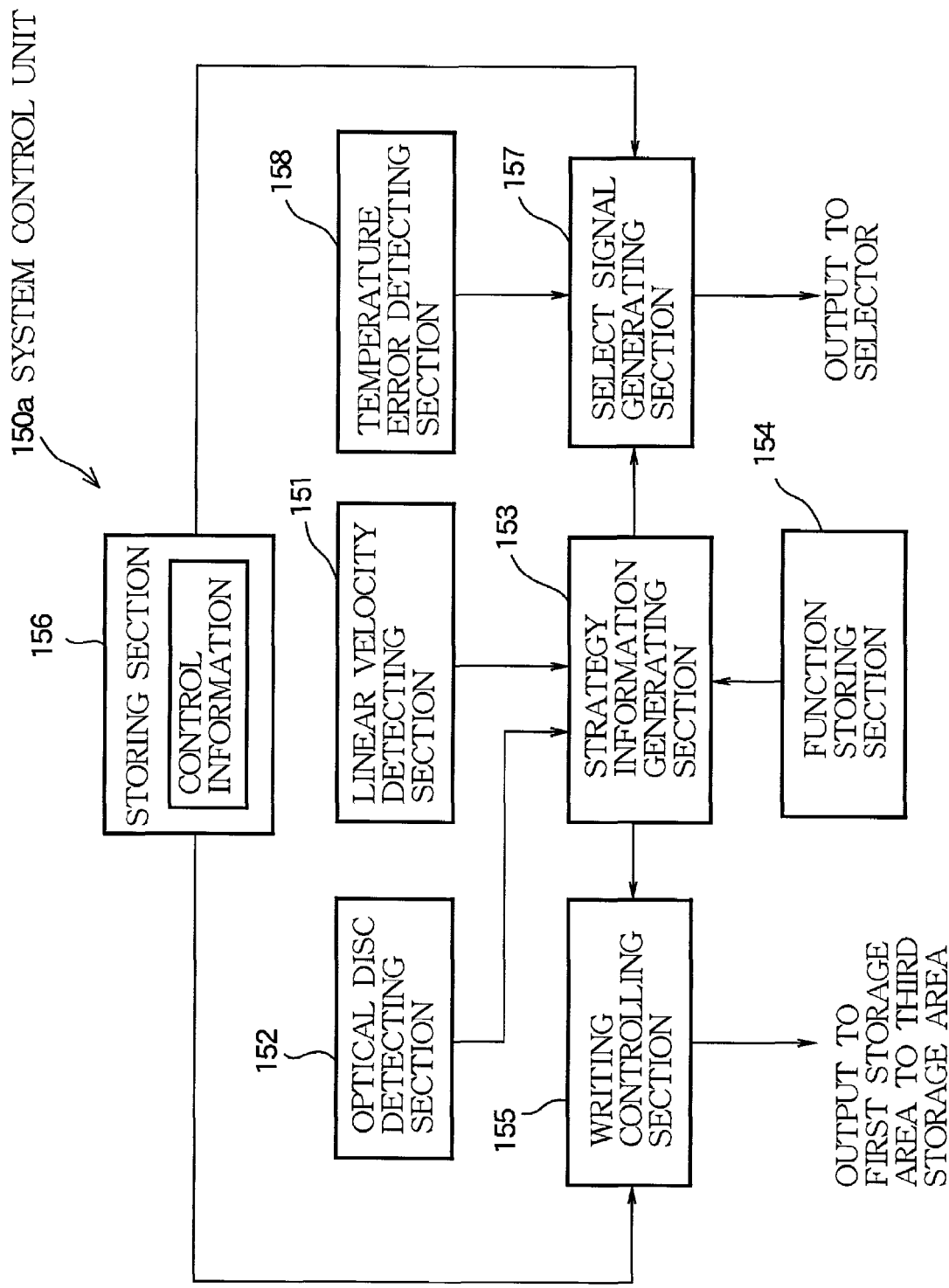
FIG. 8 is a block diagram showing a functional structure of a system control unit concerning the first modification.

FIG. 8 is a block diagrams showing a functional structure of a system control unit 150a according to the modification 1.

The system control unit 150a according to this modification has a structure that temperature error detecting section 158 is provided to the system control unit 150 shown in FIG. 2.

The temperature error detecting section 158 detects a temperature error around the light emitting device by making judgment upon whether the temperature data sequentially supplied from the temperature sensor 145 exceeds a lower limit and an upper limit (which will be generically referred to as a threshold value) of a temperature range stored in non-illustrated storing section. When the temperature difference detecting section 158 detects the temperature error, it informs the select signal generating section 157 of detection of the temperature error.

As similar to the foregoing embodiment, the strategy information generating section 153 generates the strategy information in accordance with each linear velocity based on the linear velocity s supplied from the linear velocity detecting section 151 and the functions concerning the write pulses stored in the function storing section 154.

Figure 9:
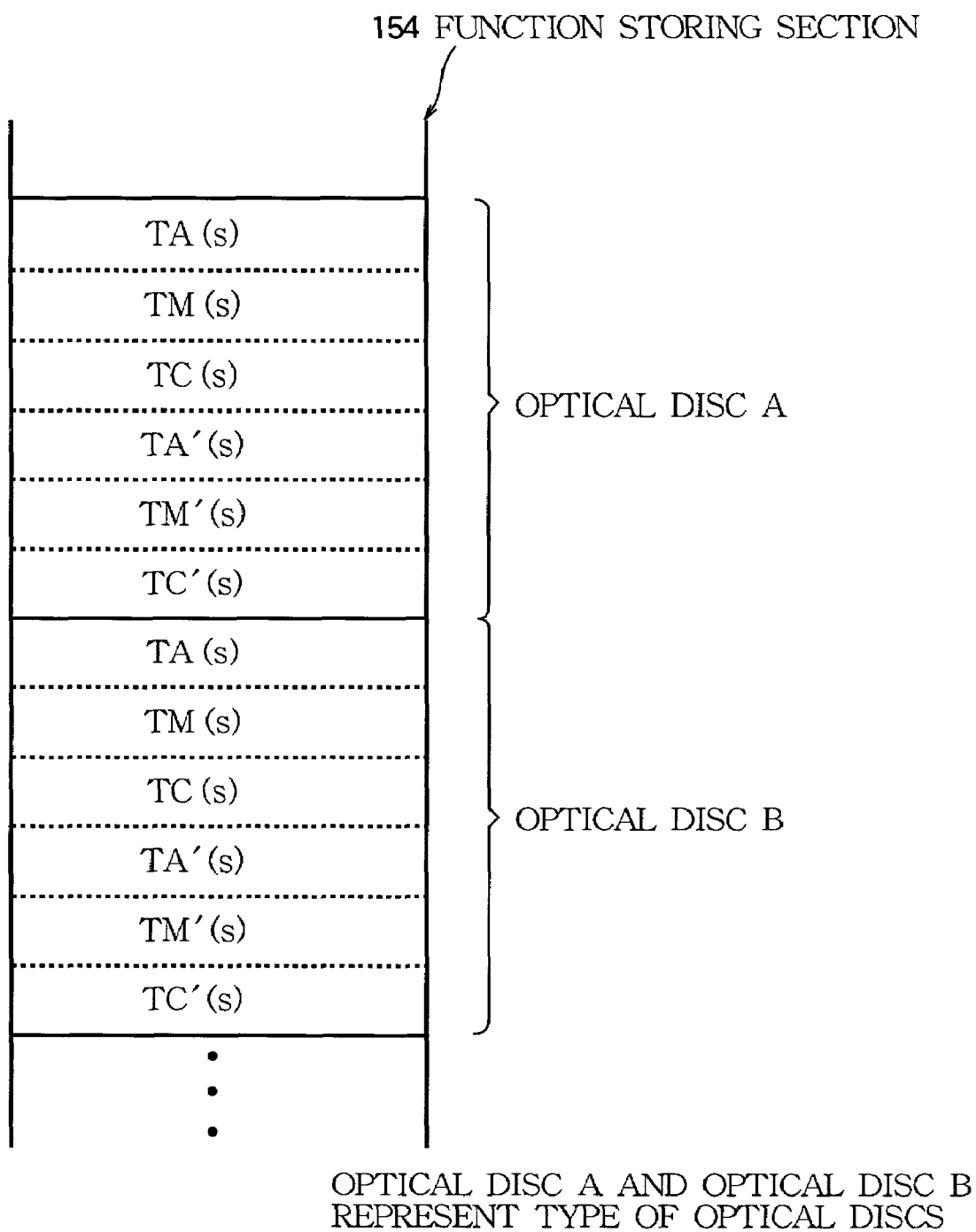
FIG. 9 is a view showing a storage state of a function storing section.

FIG. 9 is a view showing a storage status of the function storing section 154 according to the modification 1.

As shown in the drawing, the function storing section 154 according to this modification stores therein the function TA (s) of the pulse width TA, the function TM (s) of the pulse width TM and the function TC (s) of the pulse cycle TC mentioned above as well as a function TA' (s), TM' (s) and TC' (s) for error temperatures indicated by the following expressions (1) to (3).

$$TA'(s) = TA(s) + a \quad (1)$$

$$TM'(s) = TM(s) + b \quad (2)$$

$$TC'(s) = TC(s) + c \quad (3)$$

Each of a, b and c represents a quantity of correction when a temperature error is detected.

It is to be noted that the functions TA' (s), TM' (s) and TC' (s) for error temperatures can be calculated by conducting experiments or the like in advance as similar to the functions TA (s), TM (s) and TC (s).

The strategy information generating section 153 generates first strategy information including the pulse width TA, the pulse width TM and the pulse cycle TC by substituting the linear velocity s supplied from the linear velocity detecting section 151 for the functions TA (s), TM (s) and TC (s), and also generates second strategy information including the pulse width TA', the pulse width TM' and the pulse cycle TC' by substituting the linear velocity s for TA' (s), TM' (s) and TC' (s). Then, it sequentially supplies the generated first and second strategy information to the writing controlling section 155.

FIG. 10 is a view illustrating the operation of the writing controlling section 155 according to the modification 1. Incidentally, the following will give description taking the pulse widths TA and TA' constituting the first and second strategy information as an example. Moreover, the following explanation assumes that the strategy information generating section 153 receives the initial linear velocity s1 from the linear velocity detecting section 151, obtains the pulse width TA1 corresponding to the initial linear velocity s1, and thereafter supplies the pulse width TA1 to the writing controlling section 155.

Upon receiving the pulse width TA1 corresponding to the initial linear velocity s1 from the strategy information generating mean 153, the writing controlling section 155 outputs the pulse width TA1 to the first storage area 161 and sets the pulse width TA1 as the reference pulse width TAs.

When the writing controlling section 155 receives the pulse widths TA2 and the TA2' corresponding to the linear velocity s2 from the strategy information generating section 153, it calculates a difference between the reference pulse width TAs and the pulse width TA2, and compares the calculated difference with the control information concerning the pulse width TA (threshold value; 1.0 μs). Here, if the writing controlling section 155 determines that the obtained difference is smaller than the threshold value, it changes over the writing area from the first storage area 161 to the second storage area 162 and writes the received pulse width TA2 into the second storage area 162. On the other hand, it writes the pulse width TA2' for error temperatures into the third storage area 163. Thereafter, the writing controlling section 155 obtains a difference between the pulse width which is sequentially supplied from the strategy information generating section 153 and the pulse width TAs. While the obtained difference is smaller than the threshold value, the writing controlling section 155 writes the received pulse widths TAn and TAn' into the second storage area 162 and the third storage area 163 without changing the writing area.

Subsequently, when the writing controlling section 155 determines that a difference between the reference pulse width TAs and the pulse width TAn (pulse width TA7 in FIG. 10) becomes larger than the threshold value, it changes over the writing area for the received pulse width TA7 to the first storage area 161 and sets the pulse width TA7 as the reference pulse width TAs. On the other hand, the pulse width TA7' for error temperatures which is associated with the pulse width TA7 is written in the third storage area 163 without changing the writing area. As described above, the writing controlling section 155 switches only the writing area for the pulse width TAn between the first storage area 161 and the second storage 20 area 162 while fixing the writing area for the pulse width TAn' to the third storage area 163.

As similar to the foregoing embodiment, the select signal generating section 157 compares the strategy information which is sequentially supplied from the strategy information generating section 153 with the control information, and generates the select signal S1 based on a result of comparison. In addition, it generates the select signal S1 based on a content of notification from the temperature error detecting section 158 and supplies it to the selector 170. The following description assumes that an error in ambient temperature is detected by the temperature error detecting section 158 and then the ambient temperature return to normal.

(Modification 2)

Figure 11:
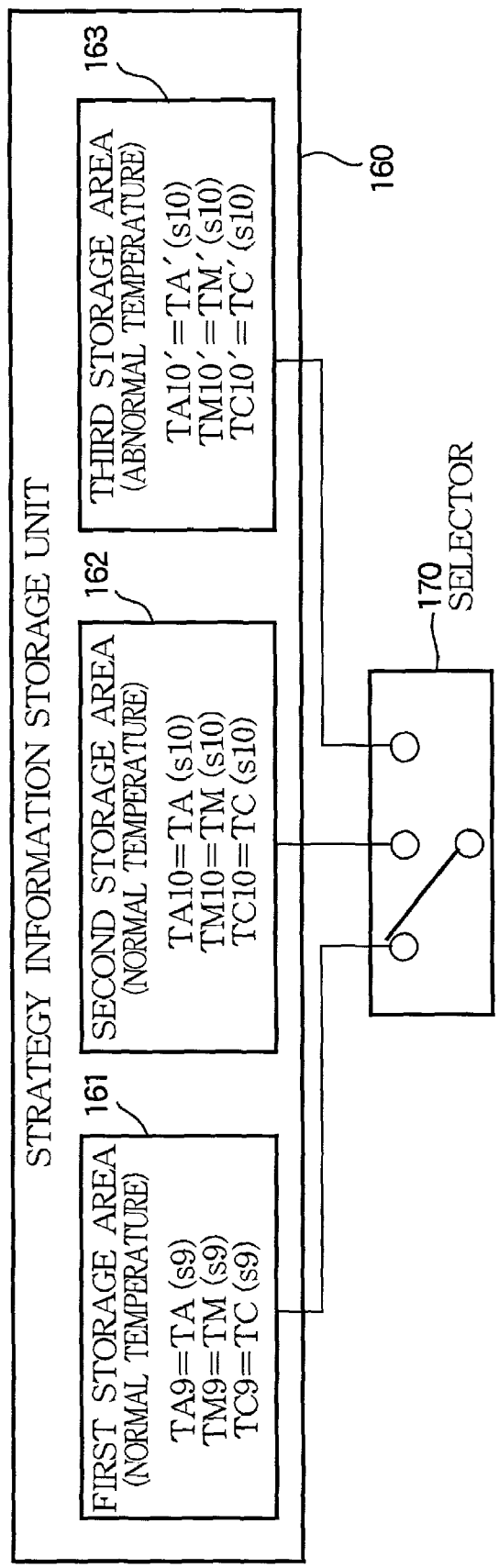
FIGS. 11(a)–11(c) are views illustrating a structure and an operation of a strategy information storage unit according to a second modification.

As shown in FIG. 11(a), in the state that the pulse width TA7, the pulse width TA8 and the pulse width TA8' are stored in each of the first to third storage areas 161 to 163 and the pulse width TA7 is selected by the selector 170, the linear velocity detecting section 151 detects the linear velocity s8, and the temperature error detecting section 158 detects a temperature error. Then, the select signal generating section 157 generates a select signal S1 which is used for selecting the pulse width TA8' for error temperatures stored in the third storage area 163, and outputs it to the selector 170. Also, the select signal generating section 157 informs the writing controlling section 155 of the fact that the pulse width TA8' stored in the third storage area 163 is selected. Upon receiving the select signal S1, the selector 170 switches from the second storage area 162 to the third storage area 163 (see FIG. 11(b)).

The strategy information generating section 153 generates the pulse width TA9' for temperature errors corresponding to the linear velocity s9 based on a result of detection outputted from the linear velocity detecting section 151, and outputs it to the writing controlling section 155. On the other hand, the writing controlling section 155 stores the pulse width TA9 and the pulse width TA9' for temperature errors in the first storage area 161 and the second storage area 162, respectively, based on the notification received from the select signal generating section 157.

When the select signal generating section 157 grasps that the ambient temperature got back to normal at a point in time that it received the linear velocity s9 from the linear velocity detecting section 151 based on the notification from the temperature error detecting section 158, it generates a select signal S1 which is used for selecting the pulse width TA9 stored in the first storage area 161 and outputs it to the selector 170. Also, the select signal generating section 157 informs the writing controlling section 155 of the fact that the pulse width TA9 stored in the first storage area 161 is selected. Upon receiving the select signal S1, the selector 170 switches from the third storage area 163 to the first storage area 161 (see FIG. 11(c)).

Based on a result of detection outputted from the linear velocity detecting section 151, the strategy information generating section 153 generates the pulse width TA10 corresponding to the linear velocity s4 and the pulse width TA10' for temperature errors and outputs them to the writing controlling section 155. On the other hand, the writing controlling section 155 stores the pulse width TA10 and the pulse width TA10' for temperature errors in the second storage area 162 and the third storage area 163, respectively, based on the notification received from the select signal generating section 157. It is to be noted that the subsequent operations of the strategy information generating section 153, the select signal generating section 157 and the selector 170 can be similarly explained, thereby omitting their account.

As described above, the storage area storing therein the strategy information for error temperatures (pulse width TA') may be appropriately switched based on a result of detection by the temperature error detecting section 158.

Here, although the storing section (not shown) according to the above-described modification 1 and this modification is configured to store a threshold value in one temperature range, it may be configured to store threshold values in a plurality of temperature ranges, for example. If the storing section is constituted in this manner, the strategy information generating section 153 generates a plurality of types of strategy information, namely, strategy information according to each temperature range with respect to one linear velocity s supplied from the linear velocity detecting section 151. A plurality of types of strategy information generated in accordance with each linear velocity by the strategy information generating section 153 is configured to be stored in different storage areas in the strategy information storage unit 160, respectively. In this manner, a plurality of temperature ranges may be set without being restricted to one.

Additionally, in case of further finely setting the temperature range, the strategy may be configured to vary in accordance with a change in temperature. In this case, the temperature sensor 145 detects a change in temperature, and functions corresponding to this change are used. That is, the function storing section 154 stores therein functions indicated by the following expressions (α) to (γ).

$$TA'''(s, \Delta t) = TA(s) + TA(\Delta t) \quad (\alpha)$$

$$TM'''(s, \Delta t) = TM(s) + TM(\Delta t) \quad (\beta)$$

$$TC'''(s, \Delta t) = TC(s) + TC(\Delta t) \quad (\gamma)$$

By storing such functions in the function storing section 154, the strategy can be changed without increasing the storage area in the strategy information storage unit 160.

<Modification 3>

Figure 12:
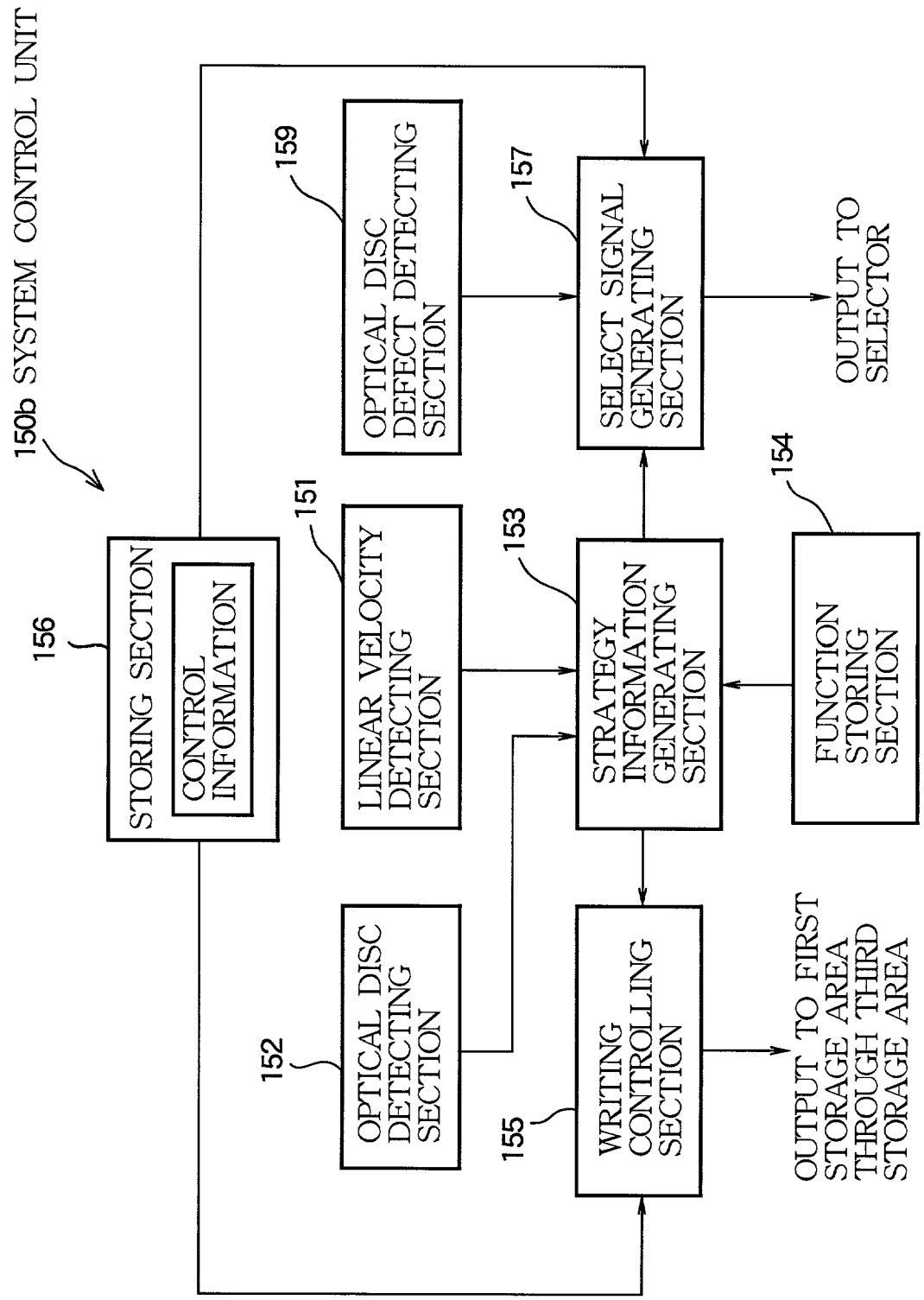
FIG. 12 is a block diagram showing a functional structure of a system control unit according to a third modification.

FIG. 12 is a block diagram showing a functional structure of the system control unit 150b according to the modification 2.

In the system control unit 150b according to this modification, optical disc defect detecting section 159 is provided in place of the ambient temperature detecting section 158 shown in FIG. 8. Since other structures are similar to those shown in FIG. 8, like reference numerals denote corresponding parts, thereby omitting their explanation.

The optical disc defect detecting section 159 detects whether a defect such as a fingerprint, dust or scratches is generated at a laser spot irradiation part on the optical disc 1 based on the light acceptance signal outputted from the optical pickup 130. The signal level of the light acceptance signal when a defect is generated at the laser spot irradiation part (abnormal case) tends to be lower than the signal level of the light acceptance signal when no defect is generated at the laser spot irradiation part (normal case). The optical disc defect detecting section 159 compares the signal level of the light acceptance signal which is sequentially outputted from the optical pickup 130 with a reference level (signal level of the light acceptance signal in the normal case) by utilizing this tendency, and detects whether a defect is generated on the optical disc 1. When the optical disc defect detecting section 159 detects an error of the optical disc 1, it informs the select signal generating section 157 of the fact that the error of the optical disc 1 has been detected.

As similar to the foregoing modification 1, the strategy information generating section 153 generates the strategy information in accordance with each linear velocity based on the linear velocity s supplied from the linear velocity detecting section 151 and functions concerning the write pulses stored in the function storing section 154.

The function storing section 154 according to this modification stores therein the function TA (s) of the pulse width TA, the function TM (s) of the pulse width TM and the function TC of the pulse cycle TC as well as functions TA" (s), TM" (s) and TC" (s) for defects indicated by the following expressions (4) to (6).

$$TA''(s) = TA(s) + d \quad (4)$$

$$TM''(s) = TM(s) + e \quad (5)$$

$$TC''(s) = TC(s) + f \quad (6)$$

Each of d, e an f represents a quantity of correction when a defect of the optical disc such as a fingerprint, dust or scratches is detected.

It is to be noted that the functions for defects TA" (s), TM" (s) and TC" (s) can be obtained by conducting experiments in advance as similar to the functions TA' (s), TM' (s) and TC' (s) indicated by the foregoing modification 1.

As similar to the foregoing modification 1, the strategy information generating section 153 obtains the first strategy information including the pulse width TA, the pulse width TM and the pulse cycle TC by substituting the linear velocity s supplied from the linear velocity detecting section 151 for the functions TA (s), TM (s) and TC (s), and likewise obtains the second strategy information including the pulse width TA", the pulse width TM" and the pulse cycle TC" by substituting the linear velocity s for TA" (s), TM" (s) and TC" (s). Then, the strategy information generating section 153 sequentially supplies the obtained first and second strategy information to the writing controlling section 155.

Incidentally, since the operations of the writing controlling section 155, the select signal generating section 157, the selector 170 and the like can be explained as with the foregoing modification 1, thereby omitting their account.

As described above, according to this modification, the strategy information can be switched in accordance with a change in linear velocity as well as presence/absence of a defect of the optical disc, and writing errors with respect to the optical disc can be thereby further reduced.

<Modification 4>

Further, the strategy information can be switched in accordance with a change in ambient temperature and presence/absence of a defect of the optical disc by utilizing the structure according to the modifications 1 and 3 mentioned above.

Figure 13:
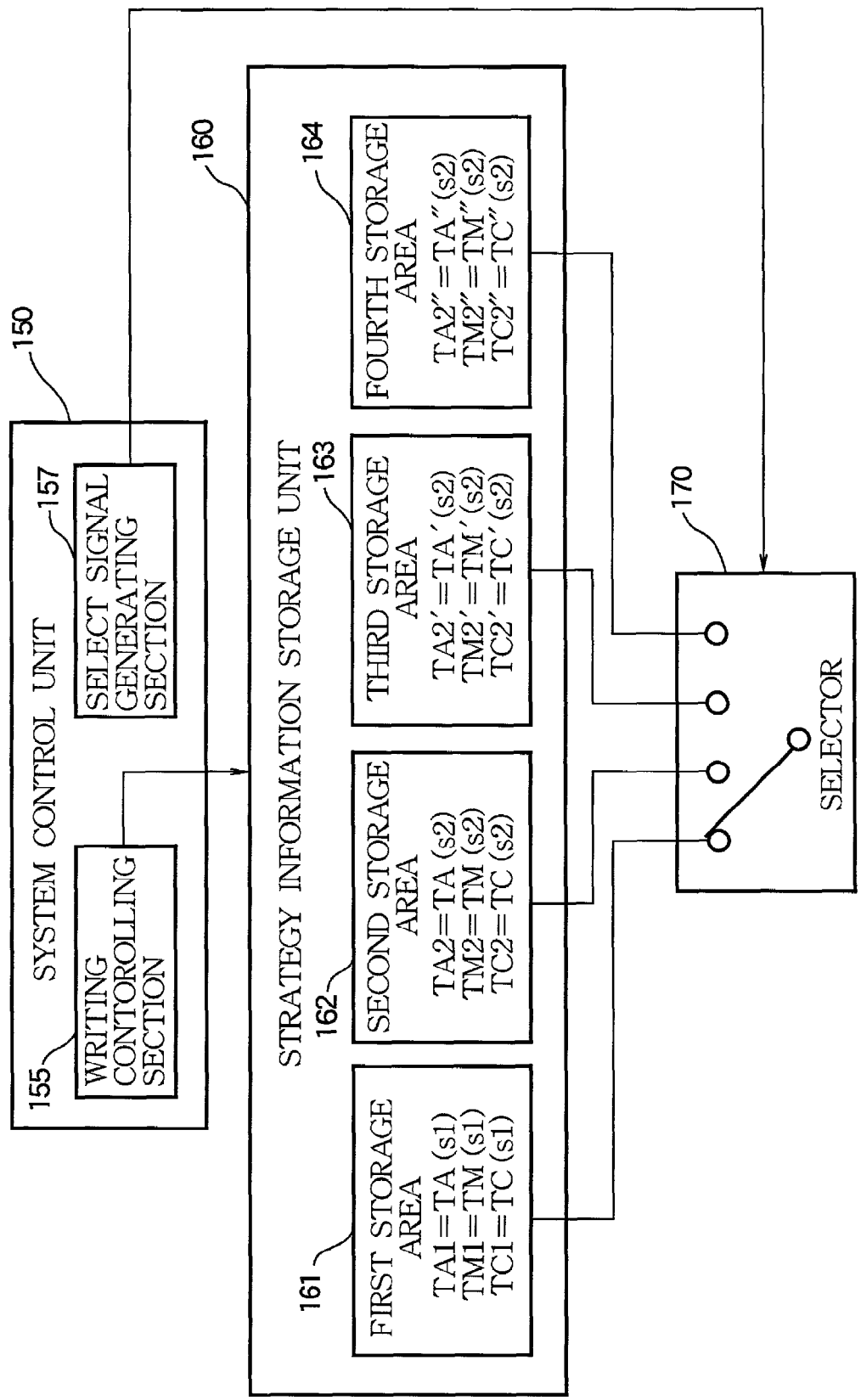
FIG. 13 is a view illustrating a structure and an operation of a strategy information storage unit according to a fourth modification.

FIG. 13 is a view illustrating the structure and the operation of the strategy information storage unit 160 according to the modification 4.

The pulse width TA1 corresponding to a linear velocity at the present moment (linear velocity s1 in FIG. 13) is stored in the first storage area 161 shown in the drawing, the pulse width TA2 corresponding to a linear velocity (linear velocity s2 in FIG. 13) different from the linear velocity at the present moment is stored in the second storage area 162, and the pulse width TA2' for error temperatures and the pulse width TA2" for defects corresponding to the linear velocity s2 are stored in the third storage area 163 and the fourth storage area 164, respectively. Based on the select signal s1 supplied from the select signal generating section 157, the selector 170 switches the storage area, and optimum strategy information according to the linear velocity, the ambient temperature and presence/absence of the optical disc can be thereby supplied to the strategy generation circuit 180 through the selector 170. Incidentally, the operations of the writing controlling section 155, the select signal generating section 157, the selector 170 and others can be explained as similar to the foregoing modifications 1 to 3, thereby omitting their account.

<Modification 5>

Figure 14:
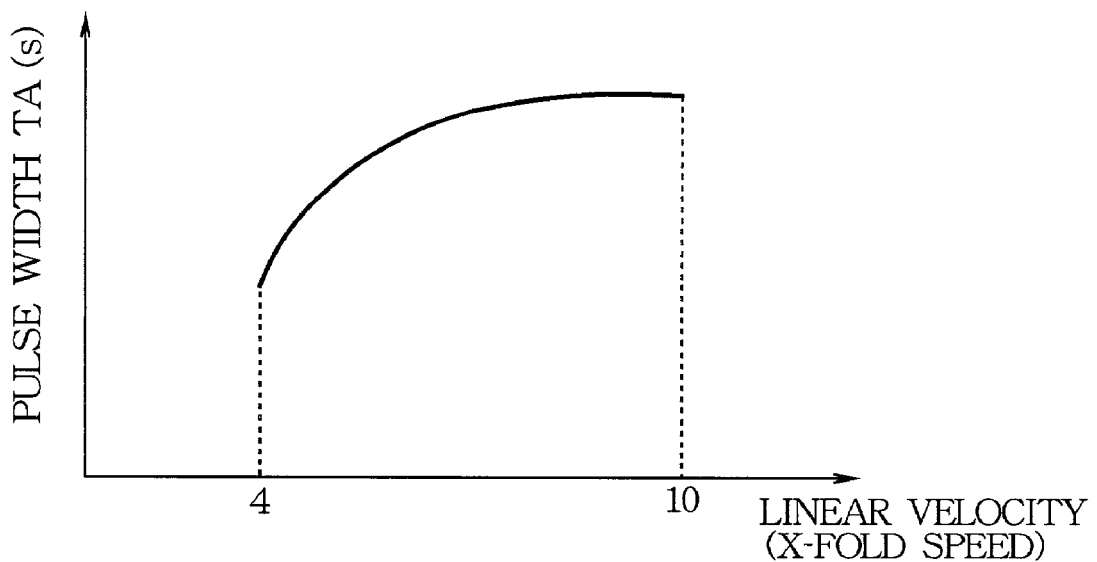
FIGS. 14(a) and 14(b) are views illustrating a function stored in function storing section according to a fifth modification.
Figure 14:
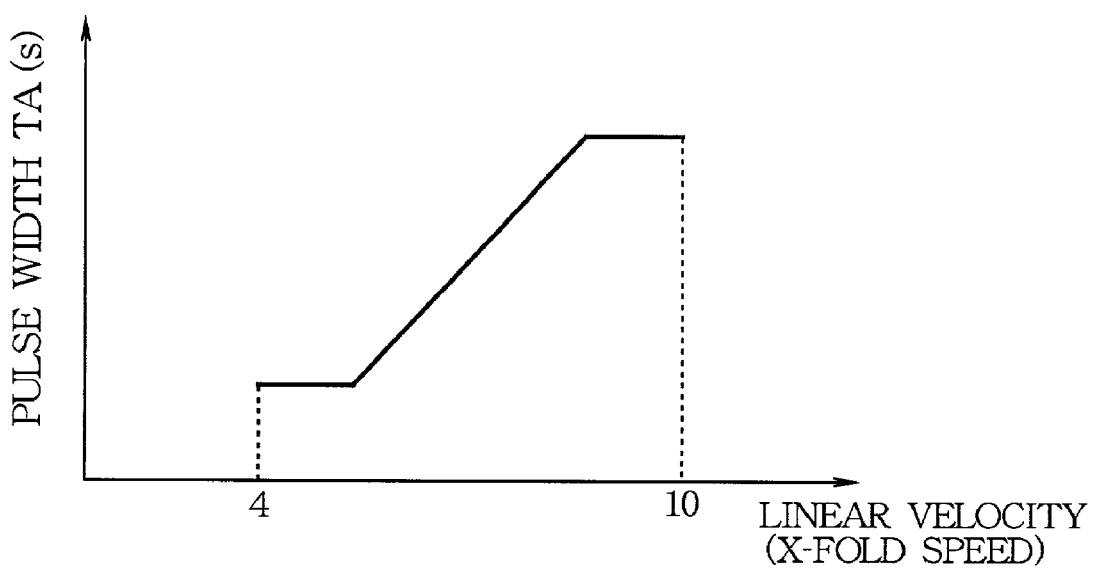

Although description has been given as to the case where the relationship between the pulse width TA constituting the strategy information and the linear velocity can be expressed by the linear function in this embodiment and each modification mentioned above, the present invention can be also applied to the case where this relationship can be expressed by the quadratic function, the cubic function or functions of higher orders as shown in FIG. 14(a). Furthermore, as shown in FIG. 14(b), the present invention can be applied to such a function as that the pulse width TA is fixed in a predetermined linear velocity range, and the inclination of each of these functions can be appropriately changed based on a result of experiments or the like.

<Modification 6>

Figure 15:
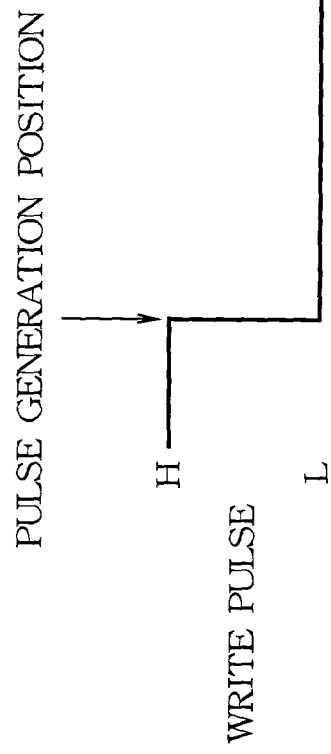
FIGS. 15(a)–15(c) are views illustrating a write pulse according to a six modification.
Figure 15:
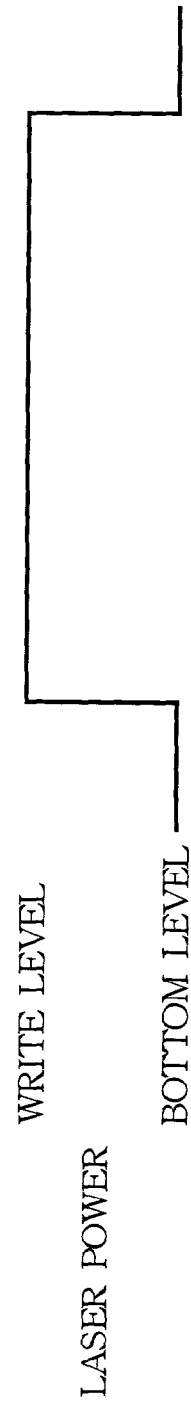
Figure 15:
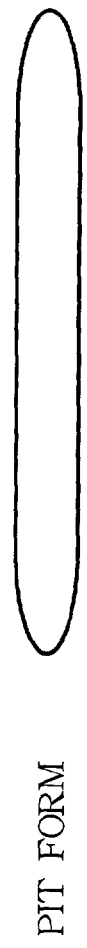

Moreover, although description has been given as the case where one pit is formed by the top pulse Ttp and subsequent N multi pulses Tmp1 to TmpN in this embodiment and each modification mentioned above, the present invention can be applied to the case where one pit is formed by one write pulse as shown in FIGS. 15(a) to 15(c), for example. In case of forming one pit by one pulse, the strategy information can be constituted by, for example, the pulse width or the timing for generating the pulse. In addition, although the CD-RW has been exemplified in this embodiment and each modification mentioned above, the present invention can be also applied to a CD-R, a DVD-R (Digital Versatile Disc Recordable), a DVD-RAM (Digital Versatile Disc Random Access Memory), a PC-RW (Phase Change ReWritable) and others.

The various functions concerning the optical disc apparatus 100 mentioned above can be realized by software. Specifically, the software is installed from a storage medium (for example, a CD-ROM or the like) having the software recorded thereon to the optical disc recording apparatus 100, or the software is downloaded from a server having this software through a network (for example, Internet) and then installed to the optical disc recording apparatus 100 through a personal computer or the like. As described above, the various functions mentioned above can be realized by software.

As mentioned above, according to the present invention, writing errors with respect to the optical disc can be reduced.

What is claimed is:

1. An apparatus for recording a signal on an optical disc by irradiating an optical beam according to a strategy which is stepwise updated by a given step amount, the apparatus comprising:
    a detector that successively detects a linear velocity of the optical disc relative to the optical beam in realtime basis;
    a strategy generator that operates every time the detector detects the linear velocity of the optical disc for successively generating the strategy according to the detected linear velocity;
    a storage having a plurality of storage areas, each being capable of memorizing the strategy successively generated by the strategy generator;
    a write controller that rewrites one of the storage areas every time the strategy is generated until the strategy is updated by a given step amount and then rewrites another of the storage areas every time the strategy is generated while leaving said one storage area to hold the updated strategy, thereby updating the strategy through the plurality of the storage areas;
    a read selector that selects the storage area holding the updated strategy to read therefrom the updated strategy while allowing the write controller to rewrite another storage area;
    a pulse generator that generates a pulse waveform shaped according to the updated strategy fed from the read selector;
    a recorder for irradiating the optical beam in response to the generated pulse waveform to record the signal on the optical disc; and
    a temperature detector that detects a temperature around the recorder, wherein the strategy generator generates multiple strategies according to the detected linear velocity for different zones of the temperature, the write controller holds the multiple updated strategies for the different zones of the temperature in the plurality of the storage areas, and the read selector selects one storage area according to the detected temperature to read therefrom the updated strategy for a particular zone of the temperature including the detected temperature.

2. The apparatus according to claim 1, wherein the pulse generator generates the pulse waveform containing an initial pulse and subsequent pulses, and the strategy generator generates the strategy according to the detected linear velocity such that the strategy contains parameters for specifying a width of the initial pulse, a width of each subsequent pulse and an interval of the subsequent pulses.

3. The apparatus according to claim 1, further comprising a motor for rotating the optical disc at a constant angular velocity such that the linear velocity varies relative to the optical beam as the optical beam moves radially of the optical disc, wherein the strategy generator successively generates the strategy every time the varying linear velocity is detected.

4. The apparatus according to claim 1, further comprising a function storage that memorizes a function for determining an optimal value of either a pulse width or a pulse frequency of the pulse waveform in relation to the linear velocity, wherein the strategy generator generates the strategy in terms of the optimal value of the pulse waveform by inputting the detected linear velocity into the function.

5. The apparatus according to claim 4, further comprising a disc detector that detects a type of an optical disc for recording of the signal, wherein the function storage memorizes a plurality of functions in correspondence to a plurality of types of the optical disc, and the strategy generator uses the function corresponding to the detected type of the optical disc for generating the strategy in matching with the detected type of the optical disc.

6. An apparatus for recording a signal on an optical disc by irradiating an optical beam according to a strategy which is stepwise updated by a given step amount, the apparatus comprising:
    a detector that successively detects a linear velocity of the optical disc relative to the optical beam in realtime basis;
    a strategy generator that operates every time the detector detects the linear velocity of the optical disc for successively generating the strategy according to the detected linear velocity;
    a storage having a plurality of storage areas, each being capable of memorizing the strategy successively generated by the strategy generator;
    a write controller that rewrites one of the storage areas every time the strategy is generated until the strategy is updated by a given step amount and then rewrites another of the storage areas every time the strategy is generated while leaving said one storage area to hold the updated strategy, thereby updating the strategy through the plurality of the storage areas;
    a read selector that selects the storage area holding the updated strategy to read therefrom the updated strategy while allowing the write controller to rewrite another storage area;
    a pulse generator that generates a pulse waveform shaped according to the updated strategy fed from the read selector;
    a recorder for irradiating the optical beam in response to the generated pulse waveform to record the signal on the optical disc; and
    a defect detector that detects a defect of the optical disc from the optical beam reflected back from the optical disc, wherein the strategy generator generates a regular strategy applicable when no defect exists on the optical disc and a substitute strategy applicable if a defect exists on the optical disc, the write controller holds the updated regular strategy and the updated substitute strategy separately from each other in the storage areas, and the read selector reads the updated substitute strategy when the defect is detected on the optical disc.

7. The apparatus according to claim 6, wherein the pulse generator generates the pulse waveform containing an initial pulse and subsequent pulses, and the strategy generator generates the strategy according to the detected linear velocity such that the strategy contains parameters for specifying a width of the initial pulse, a width of each subsequent pulse and an interval of the subsequent pulses.

8. The apparatus according to claim 6, further comprising a motor for rotating the optical disc at a constant angular velocity such that the linear velocity varies relative to the optical beam as the optical beam moves radially of the optical disc, wherein the strategy generator successively generates the strategy every time the varying linear velocity is detected.

9. The apparatus according to claim 8, further comprising a disc detector that detects a type of an optical disc for recording of the signal, wherein the function storage memorizes a plurality of functions in correspondence to a plurality of types of the optical disc, and the strategy generator uses the function corresponding to the detected type of the optical disc for generating the strategy in matching with the detected type of the optical disc.

10. The apparatus according to claim 6, further comprising a function storage that memorizes a function for determining an optimal value of either a pulse width or a pulse frequency of the pulse waveform in relation to the linear velocity, wherein the strategy generator generates the strategy in terms of the optimal value of the pulse waveform by inputting the detected linear velocity into the function.

11. An apparatus for recording a signal on an optical disc by irradiating an optical beam according to a strategy which is stepwise updated by a given step amount, the apparatus comprising:
  a detector that successively detects a linear velocity of the optical disc relative to the optical beam in realtime basis;
  a strategy generator that operates every time the detector detects the linear velocity of the optical disc for successively generating the strategy according to the detected linear velocity;
  a storage having a plurality of storage areas, each being capable of memorizing the strategy successively generated by the strategy generator;
  a write controller that rewrites one of the storage areas every time the strategy is generated until the strategy is updated by a given step amount and then rewrites another of the storage areas every time the strategy is generated while leaving said one storage area to hold the updated strategy, thereby updating the strategy through the plurality of the storage areas;
  a read selector that selects the storage area holding the updated strategy to read therefrom the updated strategy while allowing the write controller to rewrite another storage area;
  a pulse generator that generates a pulse waveform shaped according to the updated strategy fed from the read selector, the pulse waveform having an initial pulse and subsequent pulse;
  a recorder for irradiating the optical beam in response to the generated pulse waveform to record the signal on the optical disc; and
  a function storage that memorizes a first function for determining an optimal value of the width of the initial pulse in relation to the detected linear velocity, a second function for determining an optimal value-of the width of each subsequent pulse in relation to the detected linear velocity, and a third function for determining an optimal value of the interval of the subsequent pulses, wherein
  the strategy generator generates the strategy according to the detected linear velocity such that the strategy contains parameters for specifying a width of the initial pulse, a width of each subsequent pulse and an interval of the subsequent pulses, the strategy being generated in terms of the optimal values of the width of the initial pulse, the width of each subsequent pulse and the interval of the subsequent pulses by inputting the detected linear velocity into the first function, second function and third function.

12. The apparatus according to claim 11, further comprising a motor for rotating the optical disc at a constant angular velocity such that the linear velocity varies relative to the optical beam as the optical beam moves radially of the optical disc, wherein the strategy generator successively generates the strategy every time the varying linear velocity is detected.

13. An apparatus for recording a signal on an optical disc by irradiating an optical beam according to a strategy which is stepwise updated by a given step amount, the apparatus comprising:
  a detector that successively detects a linear velocity of the optical disc relative to the optical beam in realtime basis;
  a strategy generator that operates every time the detector detects the linear velocity of the optical disc for successively generating the strategy according to the detected linear velocity;
  a storage having a plurality of storage areas, each being capable of memorizing the strategy successively generated by the strategy generator;
  a write controller that rewrites one of the storage areas every time the strategy is generated until the strategy is updated by a given step amount and then rewrites another of the storage areas every time the strategy is generated while leaving said one storage area to hold the updated strategy, thereby updating the through the plurality of the storage areas;
  a read selector that selects the storage area holding the updated strategy to read therefrom the updated strategy while allowing the write controller to rewrite another storage area;
  a pulse generator that generates a pulse waveform shaped according to the updated strategy fed from the read selector, the pulse waveform having an initial pulse and subsequent pulses;
  a recorder for irradiating the optical beam in response to the generated pulse waveform to record the signal on the optical disc;
  a function storage that memorizes a first function for determining an optimal value of the width of the initial pulse in relation to the detected linear velocity, a second function for determining an optimal value-of the width of each subsequent pulse in relation to the detected linear velocity, and a third function for determining an optimal value of the interval of the subsequent pulses; and
  a disc detector that detects a type of an optical disc for recording the signal, wherein
  the function storage memorizes a plurality of first functions in correspondence to plural types of optical discs, a plurality of second functions in correspondence to plural types of optical discs and a plurality of third functions in correspondence to plural types of optical discs, and the strategy generator generates the strategy according to the detected linear velocity such that the strategy contains parameters for specifying a width of the initial pulse, a width of each subsequent pulse and an interval of the subsequent pulses, the strategy being generated in terms of the optimal values of the width of the initial pulse, the width of each subsequent pulse and the interval of the subsequent pulses by inputting the detected linear velocity into the first function, second function and third function and the strategy generator using a set of the first function, second function and third function corresponding to the detected type of the optical disc for generating the strategy matching the detected type of the optical disc.

14. A method of recording a signal on an optical disc by irradiating an optical beam according to a strategy which is stepwise updated by a given step amount, the method comprising:

successively detecting a linear velocity of the optical disc relative to the optical beam in realtime basis;

successively generating the strategy according to the detected linear velocity every time the linear velocity of the optical disc is detected;

providing a plurality of storage areas, each being capable of memorizing the strategy successively generated;

rewriting one of the storage areas every time the strategy is generated until the strategy is updated by a given step amount and then rewriting another of the storage areas every time the strategy is generated while leaving said one storage area to hold the updated strategy, thereby updating the strategy through the plurality of the storage areas;

detecting a defect of the optical disc using the optical beam reflected back from the optical disc;

selecting the storage area holding the updated strategy to read therefrom the updated strategy while allowing the rewriting of another storage area;

generating a pulse waveform shaped according to the updated strategy held in the selected storage area; and irradiating the optical beam in response to the generated pulse waveform to record the signal on the optical disc, wherein a regular strategy is generated when no defect exists on the optical disc and a substitute strategy is generated when a defect exists on the optical disc, an updated regular strategy and an updated substitute strategy are held separately from each other in the storage areas, and the storage area holding the updated substitute strategy is selected when the defect is detected on the optical disc.

15. The method according to claim 14, wherein the pulse waveform contains an initial pulse and subsequent pulses, and the strategy is generated according to the detected linear velocity such that the strategy contains parameters for specifying a width of the initial pulse, a width of each subsequent pulse and an interval of the subsequent pulses.

16. The method according to claim 14, further comprising memorizing a function for determining an optimal value of either a pulse width or a pulse frequency of the pulse waveform in relation to the linear velocity, wherein the strategy is generated in terms of the optimal value of the pulse waveform by inputting the detected linear velocity into the function.

17. The method according to claim 16, further comprising detecting a type of an optical disc for recording of the signal, wherein a plurality of functions are memorized in correspondence to a plurality of types of the optical disc, and the strategy is generated using function corresponding to the detected type of the optical disc.

18. The method according to claim 14, further comprising rotating the optical disc at a constant angular velocity such that the linear velocity varies relative to the optical beam as the optical beam moves radially of the optical disc, wherein the strategy is successively generated every time the varying linear velocity is detected.

19. A computer program for use in a disc apparatus having a processor for recording a signal on an optical disc by irradiating an optical beam according to a strategy which is stepwise updated by a given step amount, the computer program being executable by the processor for enabling the disc apparatus to perform a process comprising:

successively detecting a linear velocity of the optical disc relative to the optical beam in realtime basis;

successively generating the strategy according to the detected linear velocity every time the linear velocity of the optical disc is detected;

providing a plurality of storage areas, each being capable of memorizing the strategy successively generated;

rewriting one of the storage areas every time the strategy is generated until the strategy is updated by a given step amount and then rewriting another of the storage areas every time the strategy is generated while leaving said one storage area to hold the updated strategy, thereby updating the strategy through the plurality of the storage areas;

detecting a defect of the optical disc using the optical beam reflected back from the optical disc;

selecting the storage area holding the updated strategy to read therefrom the updated strategy while allowing the rewriting of another storage area;

generating a pulse waveform shaped according to the updated strategy held in the selected storage area; and irradiating the optical beam in response to the generated pulse waveform to record the signal on the optical disc, wherein a regular strategy is generated when no defect exists on the optical disc and a substitute strategy is generated when a defect exists on the optical disc, an updated regular strategy and an updated substitute strategy are held separately from each other in the storage areas, and the storage area holding the updated substitute strategy is selected when the defect is detected on the optical disc.

20. The computer program according to claim 19, wherein the pulse waveform contains an initial pulse and subsequent pulses, and the strategy is generated according to the detected linear velocity such that the strategy contains parameters for specifying a width of the initial pulse, a width of each subsequent pulse and an interval of the subsequent pulses.

* * * * *